United States Patent
Itoh et al.

(10) Patent No.: US 8,537,421 B2
(45) Date of Patent: Sep. 17, 2013

(54) IMAGE PROCESSING APPARATUS, METHOD, AND PROGRAM PRODUCT REMOVING SHOW-THROUGH FROM DENSITY IMAGE USING MASK IMAGE GENERATED FROM GLOSS IMAGE

(75) Inventors: Hitoshi Itoh, Kanagawa (JP); Fumihiro Nakashige, Kanagawa (JP); Keiji Kojima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 209 days.

(21) Appl. No.: 13/273,297

(22) Filed: Oct. 14, 2011

(65) Prior Publication Data

US 2012/0113443 A1 May 10, 2012

(30) Foreign Application Priority Data

Nov. 8, 2010 (JP) ................... 2010-249833

(51) Int. Cl.
 *H04N 1/409* (2006.01)
 *G06T 5/50* (2006.01)
(52) U.S. Cl.
 CPC .................................. *H04N 1/4095* (2013.01)
 USPC ............ 358/1.9; 358/3.26; 358/463; 382/275
(58) Field of Classification Search
 USPC ............... 358/1.9, 3.24, 3.26, 1.18, 505, 517, 358/530, 537, 442, 452, 463, 471, 474; 382/254, 260, 275, 309, 312, 112
 See application file for complete search history.

(56) References Cited

U.S. PATENT DOCUMENTS

| | | | |
|---|---|---|---|
| 5,548,691 A | 8/1996 | Sato et al. | |
| 5,974,160 A * | 10/1999 | Shiratori et al. | 382/112 |
| 7,064,863 B2 * | 6/2006 | Fukuda et al. | 358/1.9 |
| 7,292,375 B2 * | 11/2007 | Nishida | 358/3.26 |
| 7,620,211 B2 * | 11/2009 | Browne et al. | 382/112 |
| 2011/0273732 A1 * | 11/2011 | Kojima et al. | 358/1.9 |
| 2011/0279668 A1 * | 11/2011 | Nakashige et al. | 348/92 |
| 2011/0304862 A1 * | 12/2011 | Itoh et al. | 358/1.9 |

FOREIGN PATENT DOCUMENTS

| | | |
|---|---|---|
| JP | 3488499 | 1/2004 |
| JP | 3579182 | 10/2004 |
| JP | 3643028 | 4/2005 |
| JP | 4265421 | 5/2009 |

* cited by examiner

*Primary Examiner* — Scott A Rogers
(74) *Attorney, Agent, or Firm* — IPUSA, PLLC

(57) ABSTRACT

An image processing apparatus includes a scanning unit configured to scan at least one of two surfaces of a printed material on both of which information is printed and to obtain a density image representing intensity distribution of diffuse reflection light from the scanned surface and a gloss image representing intensity distribution of specular reflection light from the scanned surface, a mask image generating unit configured to generate a mask image for the scanned surface based on the obtained gloss image, and a show-through removing unit configured to perform mask processing on the density image using the generated mask image to generate a show-through-removed image that does not include show-through information for the scanned surface.

12 Claims, 21 Drawing Sheets

FIG.1

100
110
111 CPU
112 STORAGE UNIT
113 NETWORK I/F
114 EXTERNAL STORAGE I/F
114a STORAGE MEDIUM
115 SCANNER

FRONT SURFACE

BACK SURFACE

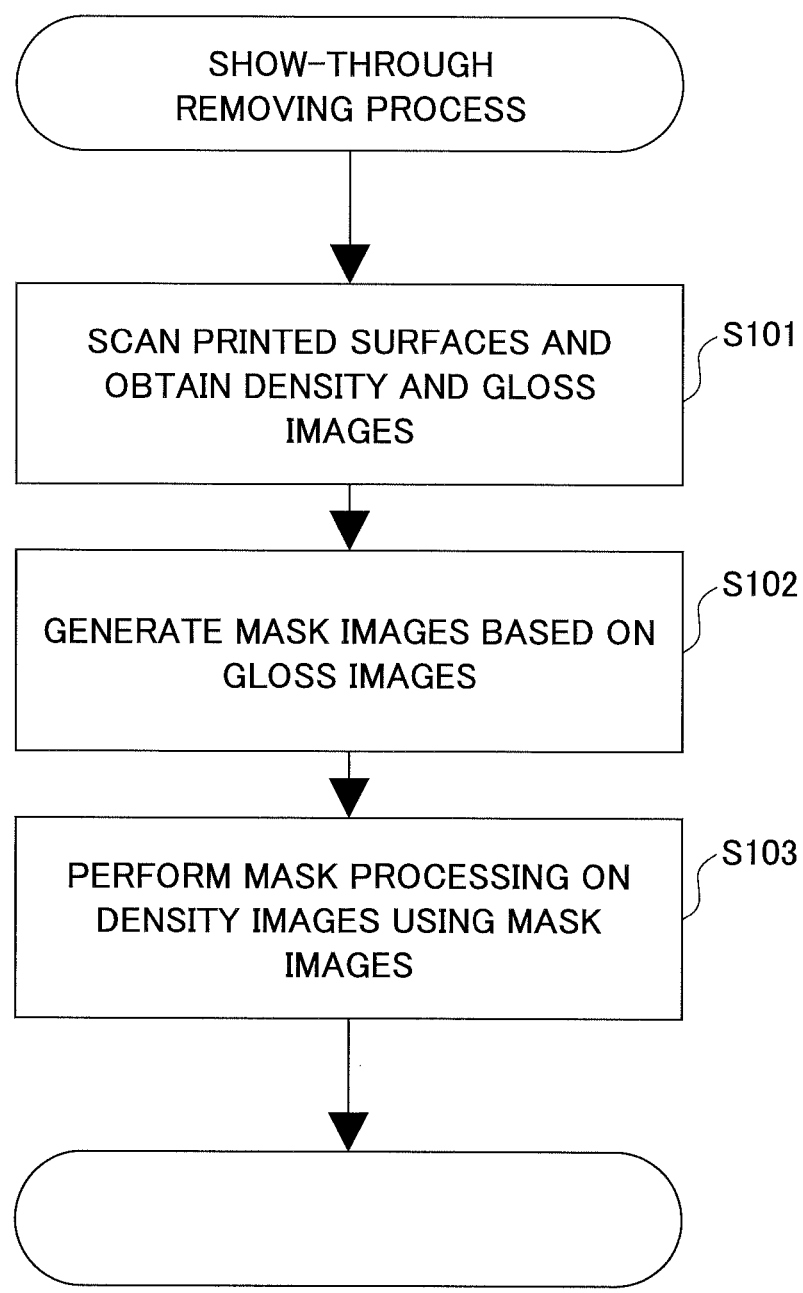

DENSITY IMAGE

Ga1

DENSITY IMAGE

Ga2

GLOSS IMAGE

Gb1

GLOSS IMAGE

Gb2

FIG.8A
GLOSS IMAGE
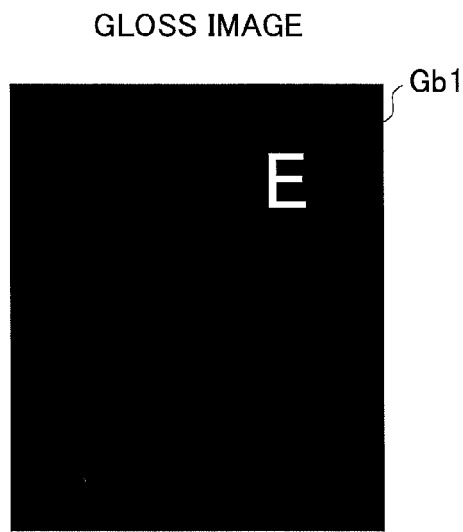
Gb1
↓
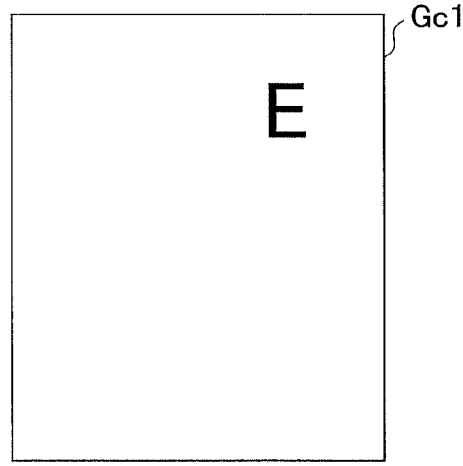
Gc1
MASK IMAGE
FIG.8B
GLOSS IMAGE
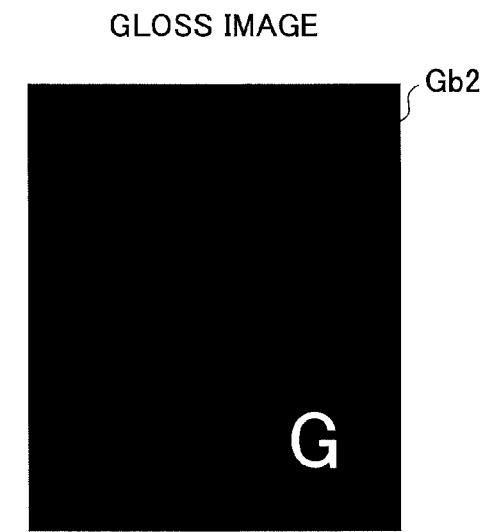
Gb2
↓
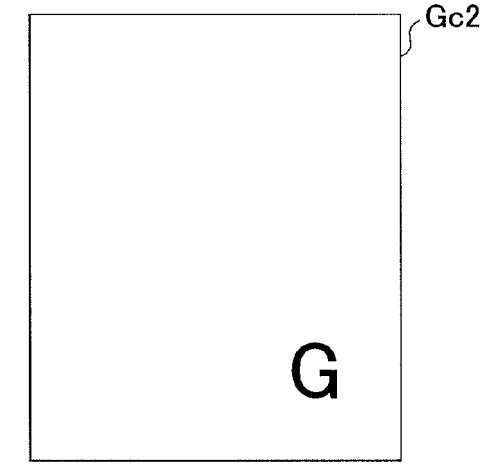
Gc2
MASK IMAGE

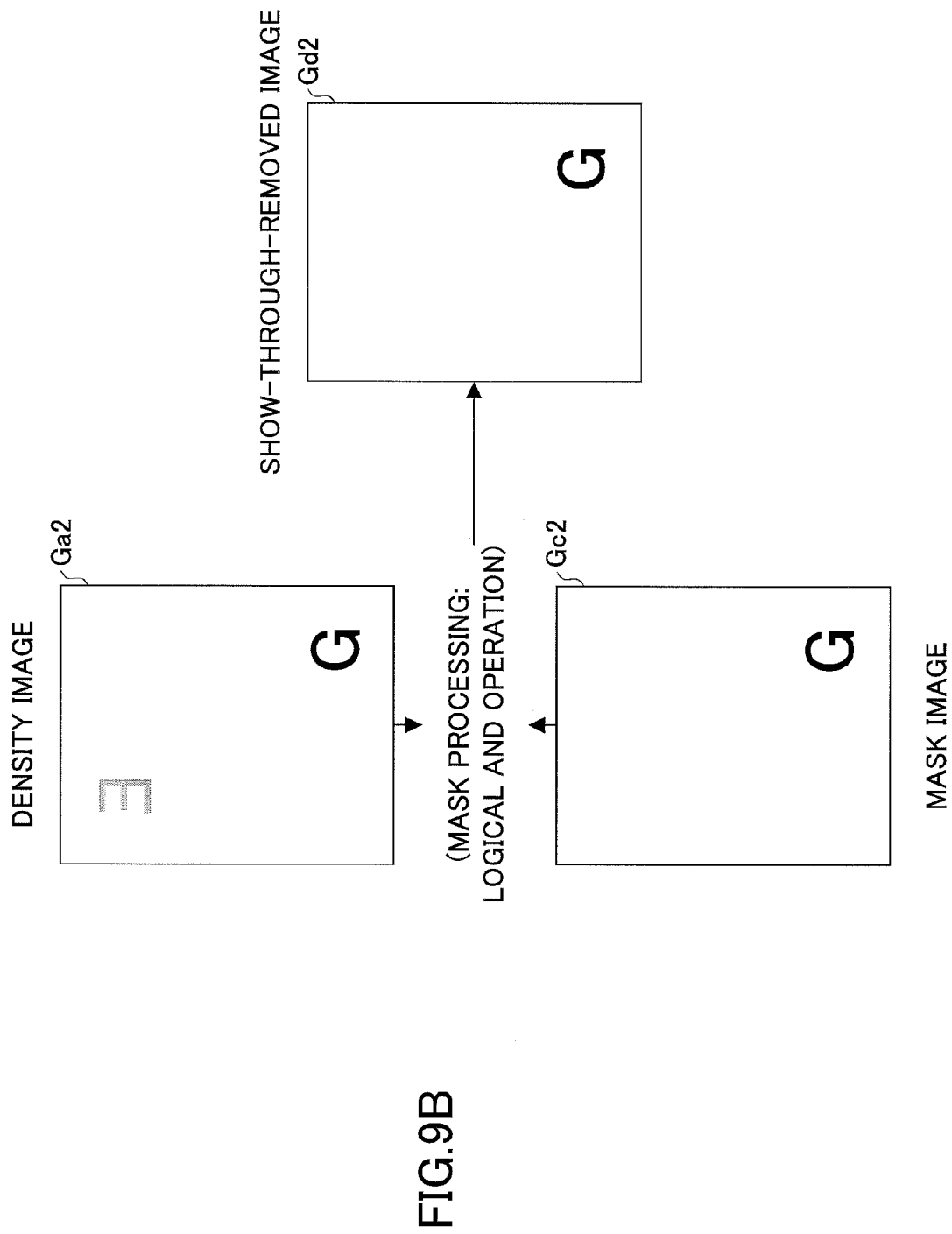

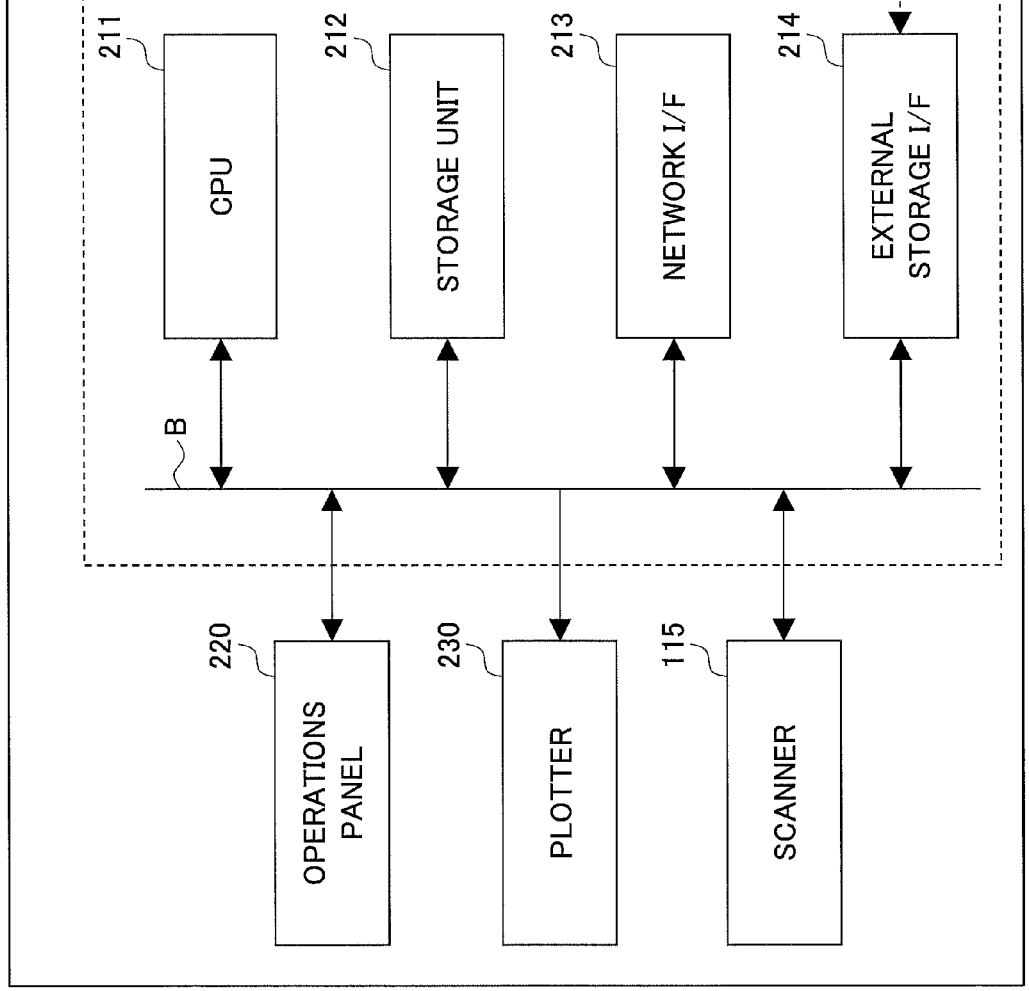

FRONT SURFACE

BACK SURFACE

DENSITY IMAGE

Ga1

DENSITY IMAGE

Ga2

GLOSS IMAGE

Gb1

GLOSS IMAGE

Gb2

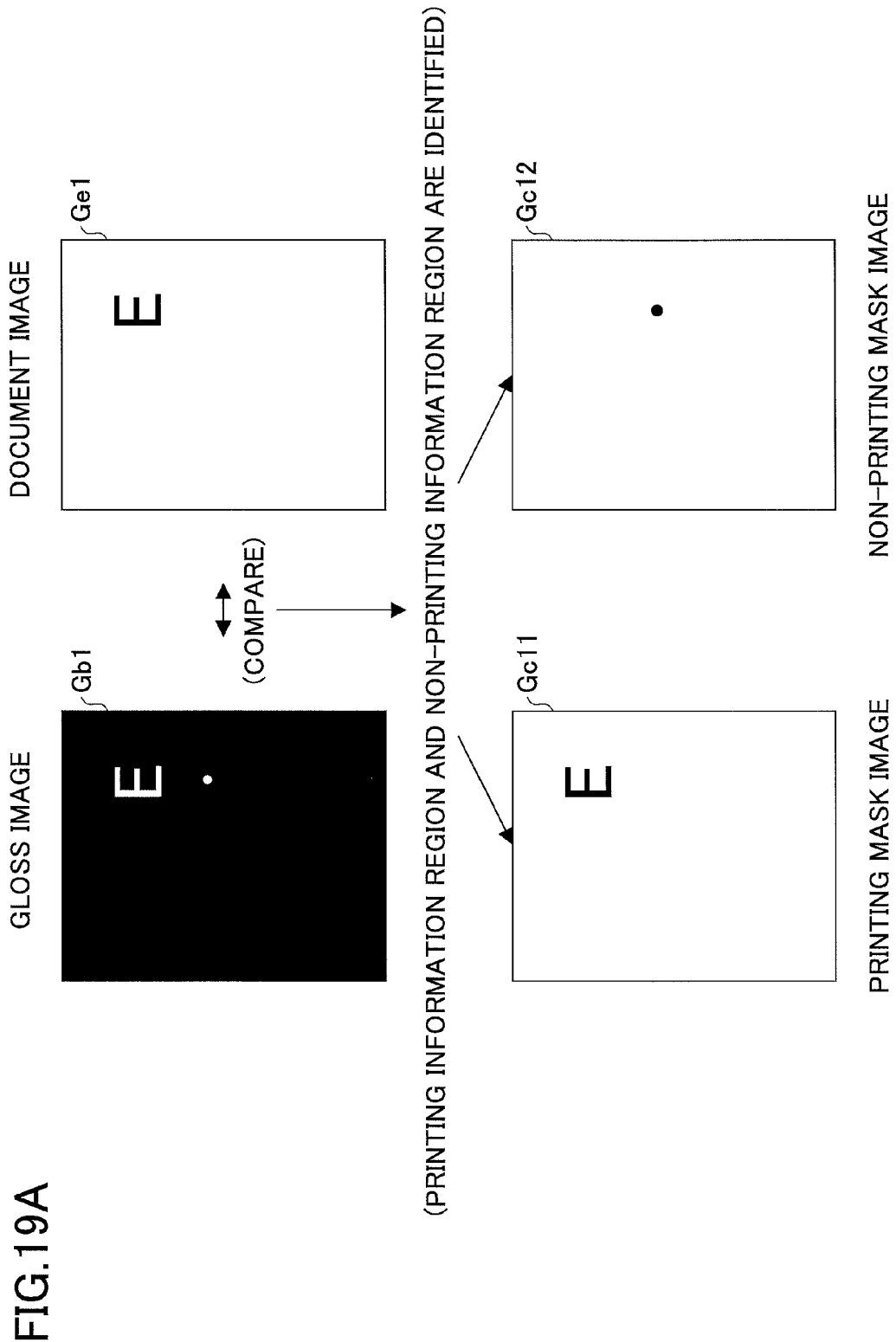

IMAGE PROCESSING APPARATUS, METHOD, AND PROGRAM PRODUCT REMOVING SHOW-THROUGH FROM DENSITY IMAGE USING MASK IMAGE GENERATED FROM GLOSS IMAGE

CROSS-REFERENCE TO RELATED APPLICATION

The present application is based upon and claims the benefit of priority of Japanese Patent Application No. 2010-249833, filed on Nov. 8, 2010, the entire contents of which are incorporated herein by reference.

BACKGROUND OF THE INVENTION

1. Field of the Invention

An aspect of this disclosure relates to a technology for scanning a printed material and obtaining a scanned image.

2. Description of the Related Art

When a double-sided printed material (a document, a printout, a printed page, etc.) having information printed on both surfaces is scanned with a scanning device such as a scanner, information printed on the back surface of the printed material may be transmitted ("show through") to the front surface of the printed material and included in a scanned image of the front surface. This problem is called a "show-through effect". Since such "show-through" information is unnecessary and undesirable, it is preferable to remove show-through information from a scanned image.

For example, Japanese Patent No. 3643028 discloses a technology for removing show-through information using a threshold that is determined based on the transmittance of paper.

With the disclosed technology, however, show-through information may not be correctly removed from a scanned image if the threshold is not appropriately determined.

Accordingly, to accurately remove show-through information, it is necessary to determine an appropriate threshold. However, it is difficult to determine an appropriate threshold taking into account the scanning conditions and scanning characteristics of a scanning device. For this reason, it is difficult to accurately remove show-through information with the disclosed technology.

SUMMARY OF THE INVENTION

In an aspect of this disclosure, there is provided an image processing apparatus that includes a scanning unit configured to scan at least one of two surfaces of a printed material on both of which information is printed and to obtain a density image representing intensity distribution of diffuse reflection light from the scanned surface and a gloss image representing intensity distribution of specular reflection light from the scanned surface, a mask image generating unit configured to generate a mask image for the scanned surface based on the obtained gloss image, and a show-through removing unit configured to perform mask processing on the density image using the generated mask image to generate a show-through-removed image that does not include show-through information for the scanned surface.

BRIEF DESCRIPTION OF THE DRAWINGS

FIG. 1 is a block diagram illustrating an exemplary hardware configuration of an image processing apparatus according to a first embodiment;

FIG. 5 is a flowchart illustrating an exemplary process of removing show-through information according to the first embodiment;

FIGS. 8A and 8B are drawings used to describe an exemplary process of generating mask images from gloss images according to the first embodiment;

FIGS. 9A and 9B are drawings used to describe an exemplary process of removing show-through information using mask images according to the first embodiment;

FIG. 10 is a block diagram illustrating an exemplary hardware configuration of an image forming apparatus;

FIGS. 19A and 19B are drawings used to describe an exemplary process of generating mask images from gloss images according to the second embodiment;

DESCRIPTION OF THE PREFERRED EMBODIMENTS

Preferred embodiments of the present invention are described below with reference to the accompanying drawings.

<<First Embodiment>>
<Hardware Configuration>

FIG. 1 is a block diagram illustrating an exemplary hardware configuration of an image processing apparatus 100 according to a first embodiment.

As illustrated in FIG. 1, the image processing apparatus 100 includes a controller 110 and a scanner 115 that are connected to each other via a bus B.

The scanner 115 optically scans a printed material or a document and generates image data. An exemplary configuration of the scanner 115 of the first embodiment is described below.

Figure 2:
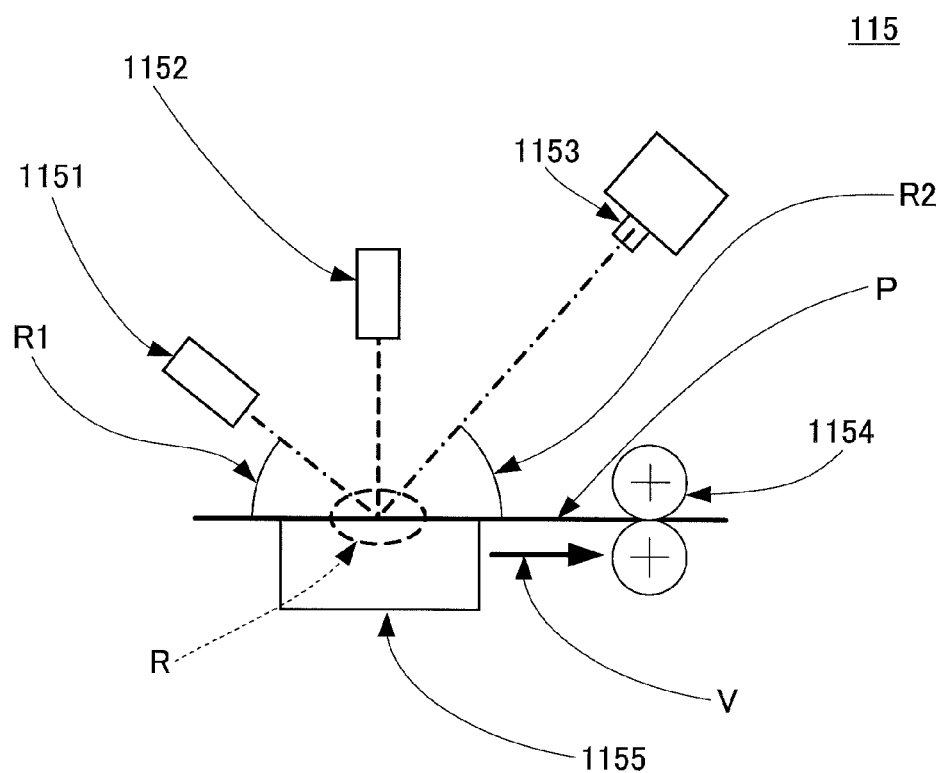
FIG. 2 is a drawing illustrating an exemplary hardware configuration of a scanner according to the first embodiment.

FIG. 2 is a drawing illustrating an exemplary hardware configuration of the scanner 115.

As illustrated in FIG. 2, the scanner 115 includes a first illuminating unit 1151, a second illuminating unit 1152, a line sensor camera 1153, a conveying unit 1154, and a reference plate 1155. With the above hardware configuration, the scanner 115 performs a scanning process as described below.

When a printed material P is placed on, for example, a paper-feed tray (not shown) of the scanner 115 and a scanning start request is received, the conveying unit 1154 rotates and thereby conveys the printed material P along the reference plate 1155 in a conveying direction V. While the printed material P is being conveyed, the first illuminating unit 1151 and the second illuminating unit 1152 are turned on to illuminate the printed material P, and the line sensor camera 1153 receives reflected light from a scanning region R on the printed material P. Then, based on the reflected light received by the line sensor camera 115, the scanner 115 generates a scanned image.

In the first embodiment, the scanner 115 includes two illuminating units 1151 and 1152, and the line sensor camera 1153 receives two types of reflected light (specular reflection light and diffuse reflection light).

The first illuminating unit 1151 is disposed such that light enters a scanned surface in the scanning region R at an incident angle R1. Meanwhile, the second illuminating unit 1152 is disposed perpendicular to the scanned surface in the scanning region R. The line sensor camera 1153 is disposed to receive light that is emitted from the first illuminating unit 1151 and reflected by the scanned surface in the scanning region R. In other words, the line sensor camera 1153 is disposed to receive light that is reflected by the scanned surface at a reflection angle R2 that is the same as the incident angle R1.

With the scanner 115 configured as described above, light emitted from the illuminating unit 1151 and entering a surface of the printed material P passing through the scanning region R is received by the line sensor camera 1153 as specular reflection light. Also, light emitted from the illuminating unit 1152 and entering the surface of the printed material P passing through the scanning region R is received by the line sensor camera 1153 as diffuse reflection light.

Referring back to FIG. 1, the controller 110 is a control circuit board including a central processing unit (CPU) 111, a storage unit 112, a network I/F 113, and an external storage I/F 114 that are connected via the bus B.

The storage unit 112 includes a random access memory (RAM), a read only memory (ROM), and a hard disk drive (HDD) and stores various programs and data. The CPU 111 loads programs and data from the ROM and the HDD into the RAM and executes the loaded programs to control the image processing apparatus 100 and thereby implement various functions. The hardware components of the scanner 115 described above are also controlled by the CPU 111.

The network I/F 113 is an interface for connecting the image processing apparatus 100 to a data communication channel such as a network. The image processing apparatus 100 can communicate with other apparatuses having communication functions via the network I/F 113. The external storage I/F 114 is an interface between the image processing apparatus 100 and a storage medium 114a used as an external storage. Examples of the storage medium 114a include a secure digital (SD) memory card, a universal serial bus (USB) memory, a compact disk (CD), and a digital versatile disk (DVD). The image processing apparatus 100 can read and write data from and to the storage medium 114a via the external storage I/F 114.

With the above hardware configuration, the image processing apparatus 100 can provide various image processing services such as optical scanning of a printed material.

<Image Processing Functions>

Image processing functions according to the first embodiment are described below.

The image processing apparatus 100 of the first embodiment optically scans printed surfaces (the front surface and the back surface) of a double-sided printed material P, and obtains density images representing the intensity distribution of diffuse reflection light from the respective printed surfaces and gloss images representing the intensity distribution of specular reflection light from the respective printed surfaces. Next, the image processing apparatus 100 generates mask images for the respective printed surfaces based on the obtained gloss images. Then, the image processing apparatus 100 performs mask processing on the density images using the generated mask images to generate show-through-removed images (images without show-through information) for the respective printed surfaces. The image processing apparatus 100 of the first embodiment includes the image processing functions as described above.

In a related-art technology, show-through information is removed using a threshold that is determined based on the transmittance of paper. However, it is difficult to determine an appropriate threshold taking into account the scanning conditions and scanning characteristics of a scanning device, and show-through information may not be correctly removed from a scanned image if the threshold is not properly determined. For this reason, it is difficult to accurately remove show-through information with the related-art technology.

In the image processing apparatus 100 of the first embodiment, a mask image is generated from a gloss image representing shapes (i.e., areas where information is printed and areas where no information is printed) of a printed surface, and mask processing is performed using the mask image on a density image representing colors (or density) on the printed surface.

As described above, the image processing apparatus 100 of the first embodiment detects specular reflection light and diffuse reflection light. Diffuse reflection indicates diffusive reflection of light other than specular reflection (see JIS Z8741 for details), and diffuse reflection light is influenced by colors of objects. A typical scanning device detects diffuse reflection light and obtains a density image representing the intensity distribution of diffuse reflection light as a scanned image. However, when a double-sided printed material is scanned with such a scanning device, show-through information that is transmitted from the back surface to the front surface (scanned surface) influences the diffuse reflection light, and as a result, the show-through information is included in the scanned image (density image).

Figure 3A:
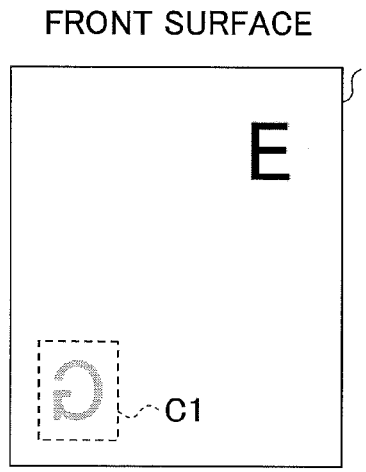
FIGS. 3A and 3B are drawings illustrating front and back surfaces of an exemplary double-sided printed material.
Figure 3B:
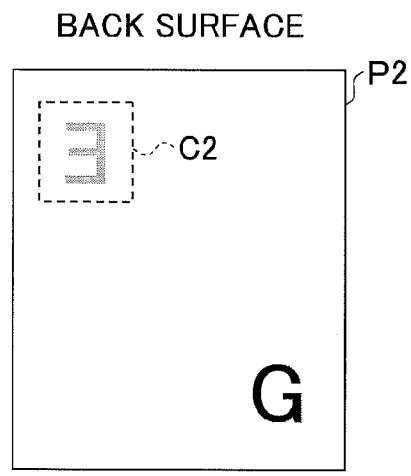

FIGS. 3A and 3B are drawings illustrating front and back surfaces of an exemplary double-sided printed material.

FIG. 3A illustrates a front surface P1, and FIG. 3B illustrates a back surface P2. As illustrated in FIG. 3A, a character "G" on the back surface P2 is transmitted to the front surface P1 (reference number C1). As illustrated in FIG. 3B, a character "E" on the front surface P1 is transmitted to the back surface P2 (reference number C2). Thus, printed information (show-through information) transmitted from the back surface P2 to the front surface P1 (scanned surface) influences the diffuse reflection light from the front surface P1 and causes "show-through phenomenon".

Specular reflection is mirror-like reflection of light according to the law of reflection (see JIS Z 8741 for details). Specular reflection light changes depending on the shapes of object surfaces and is not influenced by colors of objects. Accordingly, a gloss image representing the intensity distribution of specular reflection light cannot accurately reproduce colors of objects. However, since specular reflection light is not influenced by show-through information that is transmitted from the back surface P2 to the front surface P1 (scanned surface), the show-through information is not included in a gloss image.

In the first embodiment, show-through information is removed from a scanned image of a double-sided printed material using the characteristics of two types of reflection light. More specifically, in the first embodiment, a gloss image representing the intensity distribution of specular reflection light and a density image representing the intensity distribution of diffuse reflection light are used to distinguish scanned pixels corresponding to printed information on a scanned surface from scanned pixels corresponding to show-through information, and the show-through information is removed by mask processing.

With the above configuration, the image processing apparatus 100 of the first embodiment can accurately remove show-through information from scanned images of a double-sided printed material.

An exemplary functional configuration and operations of the image processing apparatus 100 are described below.

Figure 4:
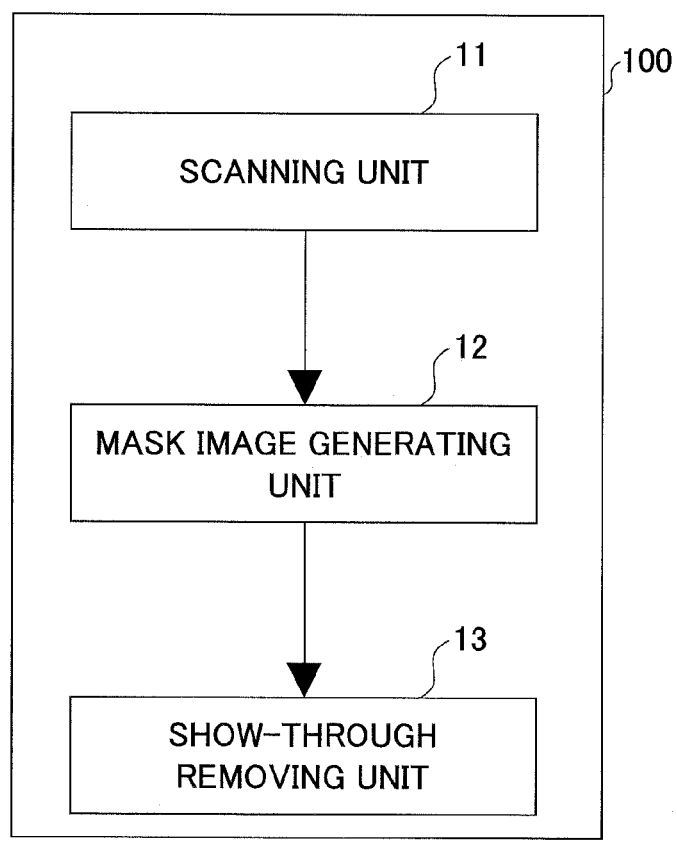
FIG. 4 is a block diagram illustrating an exemplary functional configuration of an image processing apparatus according to the first embodiment.

FIG. 4 is a block diagram illustrating an exemplary functional configuration of the image processing apparatus 100 according to the first embodiment.

As illustrated in FIG. 4, the image processing apparatus 100 may include a scanning unit 11, a mask image generating unit 12, and a show-through removing unit 13.

The scanning unit 11 is a functional unit that optically scans a printed surface of the printed material P and obtains scanned images. More specifically, the scanning unit 11 causes the scanner 115 to scan a printed surface of the printed material P and obtains two types of scanned images: a gloss image representing the intensity distribution of specular reflection light from the printed surface and a density image representing the intensity distribution of diffuse reflection light from the printed surface. When scanning both the front surface P1 and the back surface P2 of the printed material P, the scanning unit 11 obtains a gloss image and a density image for each of the front surface P1 and the back surface P2 (i.e., four images in total).

The mask image generating unit 12 is a functional unit that generates a mask image for removing show-through information. As described above, the gloss image represents the intensity distribution of specular reflection light that is not influenced by show-through information transmitted from the back surface P2 to the front surface P1 (or vice versa). Therefore, the mask image generating unit 12 generates the mask image based on the gloss image obtained by the scanning unit 11.

On a printed surface, there are areas (printed areas) where information is printed and areas (non-printed areas) where no information is printed. The printed areas are flat since toner is fused onto the printed areas. Meanwhile, the non-printed areas are surfaces composed of fibers and are therefore not flat. Since the reflectance of the printed areas for specular reflection light is greater than that of the non-printed areas, the intensity of pixels corresponding to the printed areas becomes higher than that of pixels corresponding to the non-printed areas.

Based on the above described characteristics of the gloss image, the mask image generating unit 12 identifies pixel regions with high intensity in the gloss image as the printed areas, and generates a mask image based on the identified printed areas. For example, the mask image generating unit 12 sets pixel values of the printed areas at "1" and sets other pixel values at "0" to generate a mask image. That is, in a mask image, different pixel values are assigned to pixels to be retained and pixels to be removed. When both of the front surface P1 and the back surface P2 of the printed material P are scanned by the scanning unit 11, the mask image generating unit 12 generates a mask image for each of the front surface P1 and the back surface P2 based on the corresponding gloss image (i.e., two mask images in total).

The show-through removing unit 13 is a functional unit that removes show-through information from the density image obtained by the scanning unit 11 and thereby generates a show-through-removed image. The show-through removing unit 13 performs mask processing on the density image using the mask image generated by the mask image generating unit 12 and thereby generates a show-through-removed image. More specifically, the show-through removing unit 13 performs the mask processing using the density image and the mask image corresponding to the same printed surface. In the mask processing, logical AND operations are performed between pixel values (or groups of pixel values) at the corresponding pixel positions in the density image and the mask image. For example, a pixel value "1" corresponding to show-through information in the density image is logically ANDed with the corresponding pixel value "0" in the mask image and as a result, removed.

As described above, in the image processing apparatus 100 of the first embodiment, image processing functions are implemented through collaboration among functional units. The functional units are implemented by executing software programs installed in the image processing apparatus 100. For example, the software programs are loaded by a processing unit (e.g., the CPU 111) from storage units (e.g., the HDD and/or the ROM) into a memory (e.g., the RAM) and are executed to implement the functional units of the image processing apparatus 100.

An exemplary process performed by the functional units of the image processing apparatus 100 of the first embodiment (collaboration among the functional units) is described below with reference to FIGS. 5 through 9B.

<Process of Removing Show-Through Information>

FIG. 5 is a flowchart illustrating an exemplary process of removing show-through information (show-through removing process) according to the first embodiment.

As illustrated in FIG. 5, the scanning unit 11 of the image processing apparatus 100 scans printed surfaces (the front surface P1 and the back surface P2) of the printed material P, and obtains a density image and a gloss image for each of the printed surfaces (step S101).

Figure 6A:
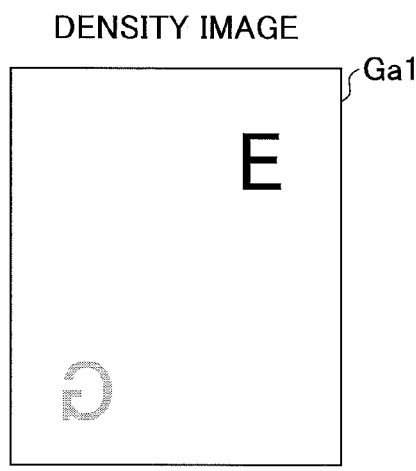
FIGS. 6A and 6B are drawings illustrating exemplary density images obtained by scanning front and back surfaces of a printed material.
Figure 6B:
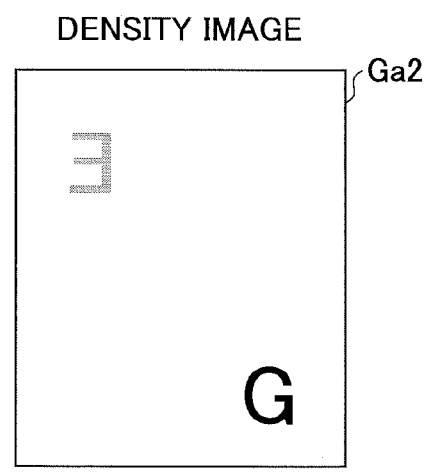

FIGS. 6A and 6B are drawings illustrating exemplary density images obtained by scanning the front and back surfaces P1 and P2 of the printed material P.

FIG. 6A illustrates a density image Ga1 obtained by scanning the front surface P1, and FIG. 6B illustrates a density image Ga2 obtained by scanning the back surface P2. In this exemplary process, the scanning unit 11 obtains the density images Ga1 and Ga2 (may be called a density image(s) Ga when distinction is not necessary) for the respective printed surfaces.

Figure 7A:
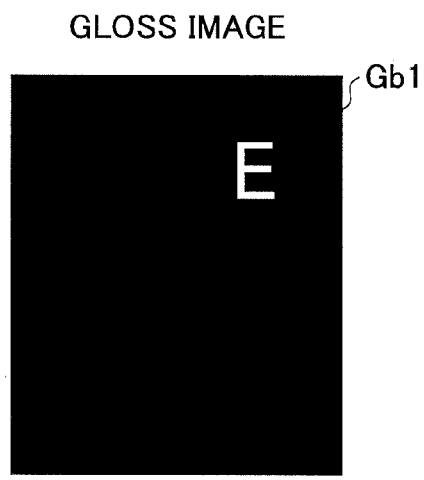
FIGS. 7A and 7B are drawings illustrating exemplary gloss images obtained by scanning front and back surfaces of a printed material.
Figure 7B:
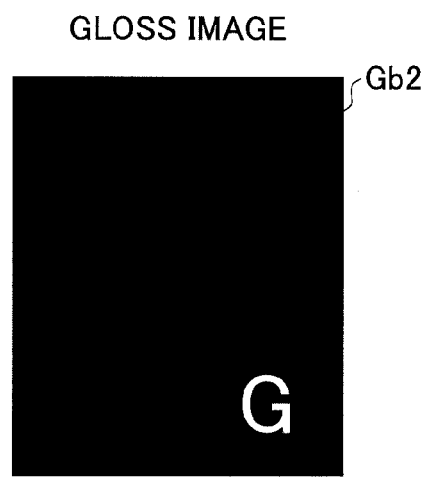

FIGS. 7A and 7B are drawings illustrating exemplary gloss images obtained by scanning the front and back surfaces P1 and P2 of the printed material P.

FIG. 7A illustrates a gloss image Gb1 obtained by scanning the front surface P1, and FIG. 7B illustrates a gloss image Gb2 obtained by scanning the back surface P2. In this exemplary process, the scanning unit 11 obtains the gloss images Gb1 and Gb2 (may be called a gloss image(s) Gb when distinction is not necessary) for the respective printed surfaces.

Referring back to FIG. 5, the mask image generating unit 12 generates mask images Gc1 and Gc2 used to remove show-through information based on the gloss images Gb1 and Gb2 (step S102).

FIGS. 8A and 8B are drawings used to describe an exemplary process of generating the mask images Gc1 and Gc2 from the gloss images Gb1 and Gb2.

FIG. 8A illustrates the mask image Gc1 generated from the gloss image Gb1, and FIG. 8B illustrates the mask image Gc2 generated from the gloss image Gb2. As illustrated in FIGS. 8A and 8B, the mask image generating unit 12 identifies pixel regions with high intensity (white characters "E" and "G") in the gloss images Gb1 and Gb2 as printed areas, and generates the mask images Gc1 and Gc2 where the pixel values of pixels corresponding to the identified printed areas are set at "1" and the pixel values of other pixels are set at "0". Through the above process, the mask image generating unit 12 generates the mask images Gc1 and Gc2 (may be called a mask image(s) Gc when distinction is not necessary) for the respective printed surfaces.

Referring back to FIG. 5, the show-through removing unit 13 performs mask processing on the density images Ga1 and Ga2 using the corresponding mask images Gc1 and Gc2 (step S103).

Figure 9A:
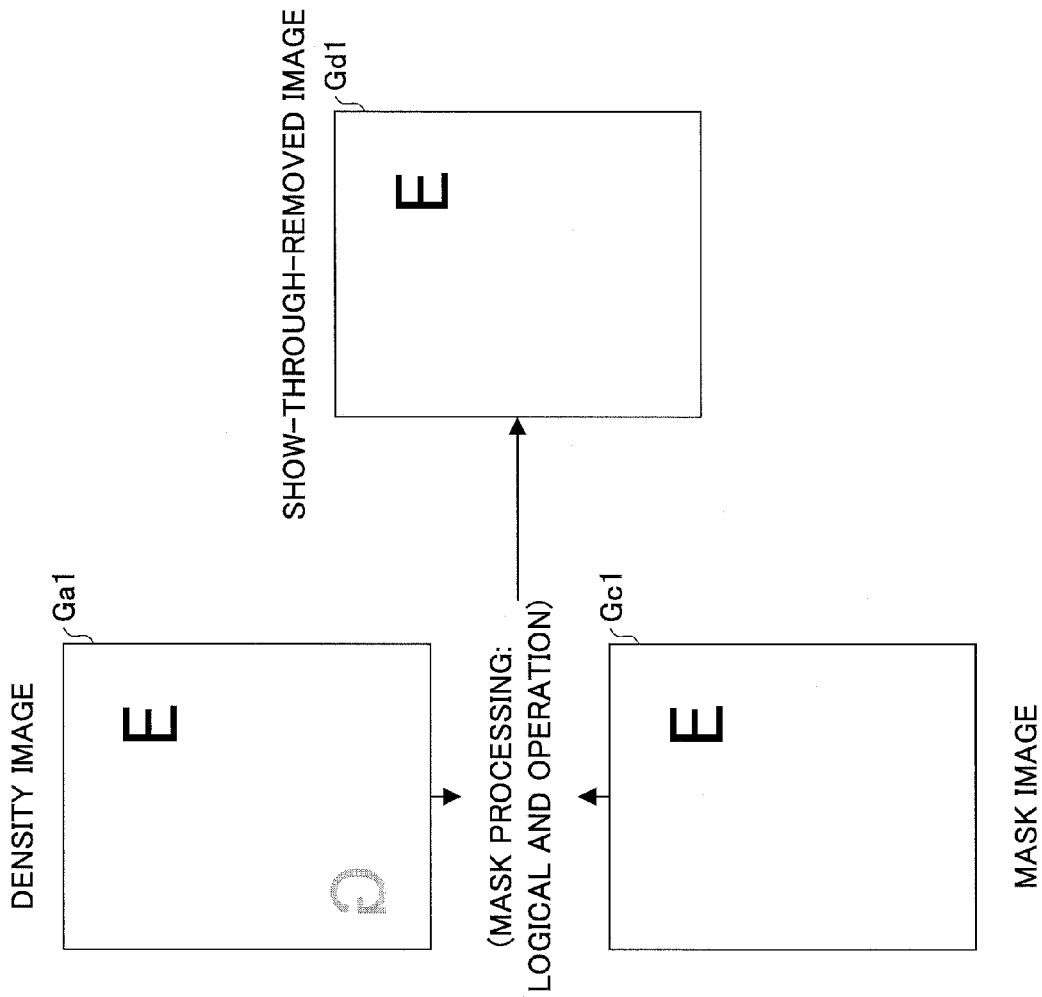

FIGS. 9A and 9B are drawings used to describe an exemplary process of removing show-through information using the mask images Gc1 and Gc2.

FIG. 9A illustrates a show-through-removed image Gd1 generated using the mask image Gc1 corresponding to the front surface P1, and FIG. 9B illustrates a show-through-removed image Gd2 generated using the mask image Gc2 corresponding to the back surface P2. As illustrated in FIGS. 9A and 9B, the show-through removing unit 13 performs logical AND operations between the pixel values (or groups of pixel values) in the density images Ga1 and Ga2 and the pixel values (or groups of pixel values) at the corresponding pixel positions in the mask images Gc1 and Gc2, and thereby generates the show-through-removed images Gd1 and Gd2. Through the above process, the show-through removing unit removes show-through information from the density images Ga1 and Ga2 and thereby generates the show-through-removed images Gd1 and Gd2 (may be called a show-through-removed image(s) Gd when distinction is not necessary).

The mask image generation step (S102) and the mask processing step (S103) for plural printed surfaces may be performed in parallel to increase the speed of image processing.

<Summary>

As described above, with the image processing apparatus 100 of the first embodiment, the scanning unit 11 optically scans printed surfaces (the front surface and the back surface) of the double-sided printed material P, and obtains the density images Ga representing the intensity distribution of diffuse reflection light and the gloss images Gb representing the intensity distribution of specular reflection light for the respective printed surfaces. Next, the mask image generating unit 12 generates the mask images Gc for the respective printed surfaces based on the obtained gloss images Gb. Then, the show-through removing unit 13 performs mask processing (logical AND operation) on the density images Ga using the generated mask images Gc to generate the show-through-removed images Gd for the respective printed surfaces.

With this configuration, the image processing apparatus 100 of the first embodiment can accurately remove show-through information from scanned images of a double-sided printed material.

Japanese Patent No. 4265421 discloses a technology for reducing show-through information using a scanned image (density image) obtained by scanning the front surface P1 with no information printed on the back surface P2 and a scanned image obtained by scanning the front surface P1 with information also printed on the back surface P2. In the disclosed technology, information is first printed only on the front surface P1 and the front surface P1 is scanned, and then information is printed on the back surface P2 and the front surface P1 is scanned again. Accordingly, the disclosed technology makes it necessary to use multiple scanning devices to scan printed surfaces and to convey the printed material P through complicated conveying paths. Such a configuration increases the chance of problems such as paper jam. Also with the disclosed technology, it is necessary to perform adjustments such as calibration and positioning for the respective scanning units. Thus, the disclosed technology complicates a process of removing show-through information, particularly when it is performed for a large number of printed materials (for example, in an inspection process for commercial printing).

Meanwhile, the first embodiment makes it possible to remove show-through information by simply scanning the front surface P1 and the back surface P2 of the double-sided printed material P. Accordingly, compared with the related-art technology, the first embodiment may be implemented by a simpler configuration and a simpler process. Thus, the first embodiment makes it possible to accurately and efficiently remove show-through information from a large number of printed materials.

<Variations>

Variations of the first embodiment are described below.

[First Variation]

In the first embodiment, the image processing apparatus 100 including an image scanning function (i.e., the scanner 115) is used as an example of an apparatus that provides image processing functions. Alternatively, the first embodiment may be applied to an image forming apparatus such as a multifunction peripheral (MFP) that includes a printing function (i.e., a plotter) in addition to an image scanning function.

FIG. 10 is a block diagram illustrating an exemplary hardware configuration of an image forming apparatus 200 that provides image processing functions.

As illustrated in FIG. 10, the image forming apparatus 200 may include a controller 210, an operations panel 220, a plotter 230, and a scanner 115 that are connected to each other via a bus B.

The operations panel 220 includes a display unit for providing information such as device information to the user and an input unit for receiving user inputs such as settings and instructions. The plotter 230 includes an image forming unit for forming an image on a recording medium (e.g., paper). For example, the plotter 230 forms an image by electrophotography or inkjet printing.

The controller 210 is a control circuit board including a CPU 211, a storage unit 212, a network I/F 213, and an external storage I/F 214 that are connected via the bus B.

The storage unit 211 includes a RAM, a ROM, and an HDD for storing programs and data. The CPU 212 loads programs and data from the ROM and the HDD into the RAM and executes the loaded programs to control the image forming apparatus 200 and thereby implement various functions.

The network I/F 213 is an interface for connecting the image forming apparatus 200 to a data communication channel such as a network. The image forming apparatus 200 can communicate with other apparatuses having communication functions via the network I/F 213. The external storage I/F 214 is an interface between the image forming apparatus 200 and a storage medium 214a used as an external storage. Examples of the storage medium 214a include an SD memory card, a USB memory, a CD, and a DVD. The image forming apparatus 200 can read and write data from and to the storage medium 214a via the external storage I/F 214.

With the above hardware configuration, the image forming apparatus 200 can execute software programs with a processing unit to implement the functional units described in the first embodiment and thereby provide various image processing functions (image processing services).

[Second Variation]

The first embodiment may also be applied to an image processing system as described below.

Figure 11:
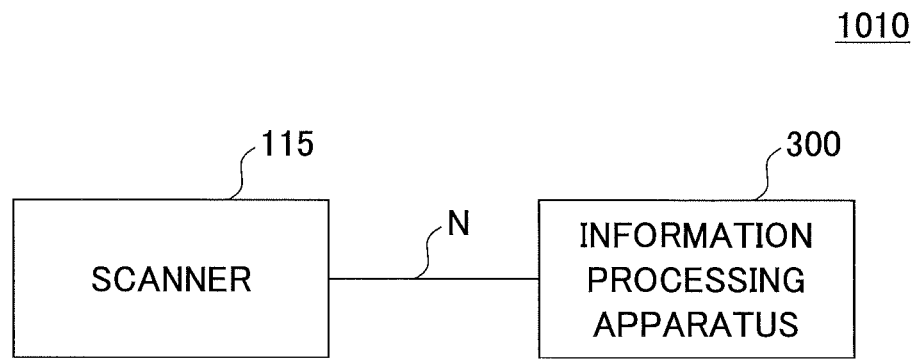
FIG. 11 is a drawing illustrating an exemplary configuration of an image processing system.

FIG. 11 is a drawing illustrating an exemplary configuration of an image processing system 1010.

As illustrated in FIG. 11, the image processing system 1010 includes a scanner 115 and an information processing apparatus 300 that are connected to each other via a data communication channel N (e.g., a network cable or a serial/parallel cable).

The information processing apparatus 300 may be implemented by, for example, a personal computer (PC) that includes a computing function and an input/output function.

Figure 12:
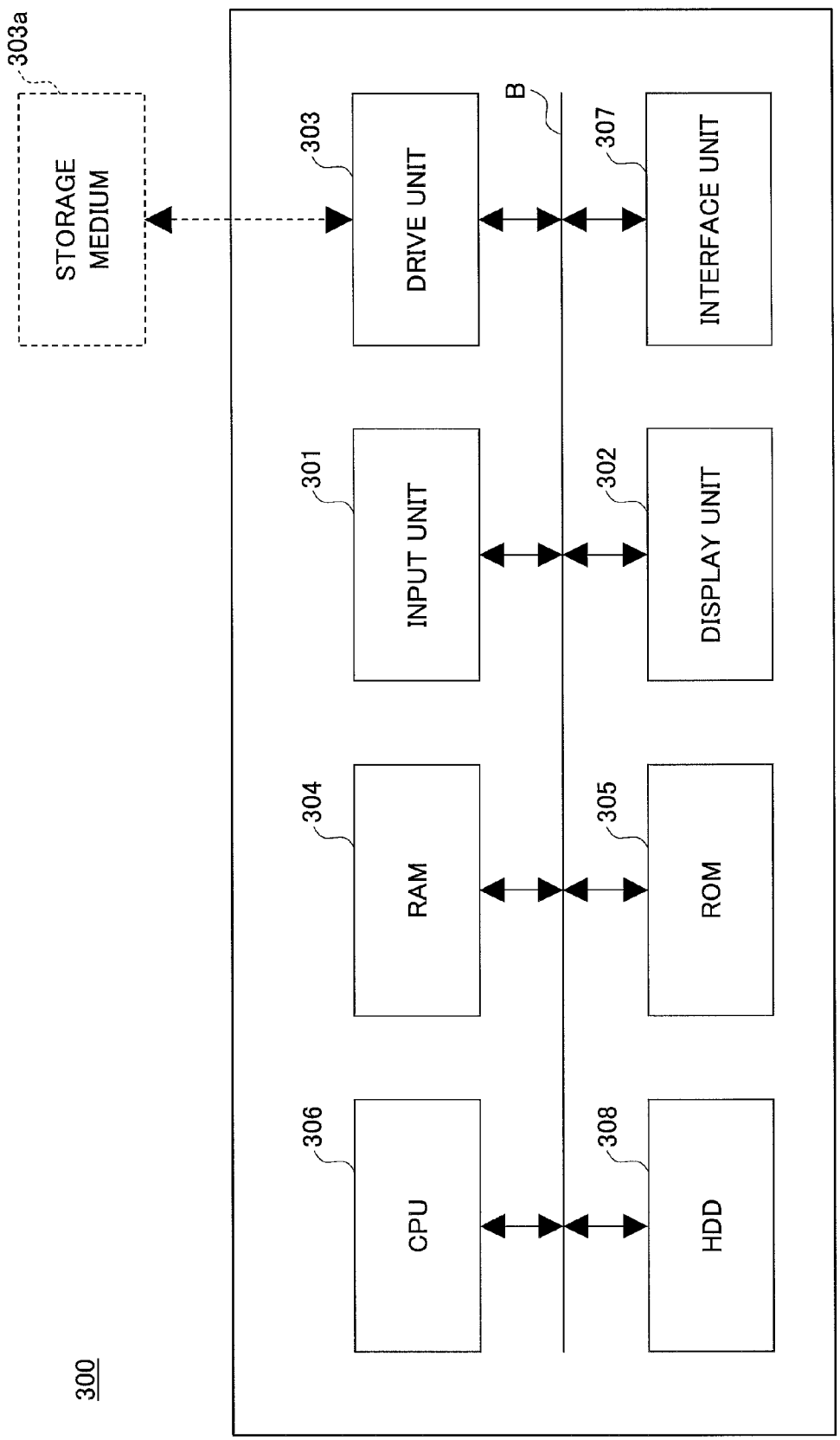
FIG. 12 is a block diagram illustrating an exemplary hardware configuration of an information processing apparatus.

FIG. 12 is a block diagram illustrating an exemplary hardware configuration of the information processing apparatus 300 of the image processing system 1010.

As illustrated in FIG. 12, the information processing apparatus 300 may include an input unit 301, a display unit 302, a drive unit 303, a random access memory (RAM) 304, a read only memory (ROM) 305, a central processing unit (CPU) 306, an interface unit 307, and a hard disk drive (HDD) 308 that are connected to each other via a bus B.

The input unit 301 includes, for example, a keyboard and a mouse, and is used to input instructions (or operation signals) to the information processing apparatus 300. The display unit 302 displays, for example, processing results of the information processing apparatus 300.

The interface unit 307 connects the information processing apparatus 300 to the data communication channel N. The information processing apparatus 300 can communicate with the scanner 115 having a communication function via the interface unit 307.

The HDD 308 is a non-volatile storage medium for storing various programs and data. For example, the HDD 208 stores basic software (e.g., an operating system such as Windows (trademark/registered trademark) or UNIX (trademark/registered trademark)) for controlling the entire information processing apparatus 300, and applications that run on the basic software and provide various functions (e.g., image processing functions). The HDD 308 may manage the stored programs and data using a file system and/or a database (DB).

The drive unit 303 is an interface between the information processing apparatus 300 and a removable storage medium 303a. The information processing apparatus 300 can read and write data from and to the storage medium 303a via the drive unit 303. Examples of the storage medium 303a include a floppy (flexible) disk (FD), a compact disk (CD), a digital versatile disk (DVD), an SD memory card, and a USB memory.

The ROM 305 is a non-volatile semiconductor memory (storage unit) that can retain data even when the power is turned off. For example, the ROM 305 stores programs and data such as a basic input/output system (BIOS) that is executed when the information processing apparatus 300 is turned on, and system and network settings of the information processing apparatus 300. The RAM 304 is a volatile semiconductor memory (storage unit) for temporarily storing programs and data. The CPU 306 loads programs and data from storage units (e.g., the HDD 308 and the ROM 305) into the RAM 304 and executes the loaded programs to control the information processing apparatus 300 and to perform various functions.

An exemplary functional configuration of the image processing system 1010 is described below.

Figure 13:
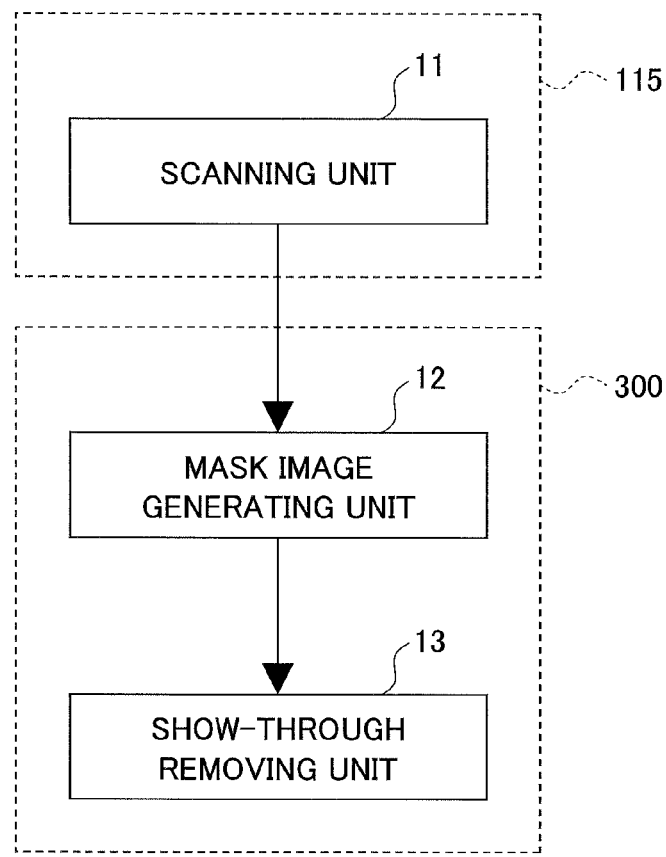
FIG. 13 is a block diagram illustrating an exemplary functional configuration of an image processing system.

FIG. 13 is a drawing illustrating an exemplary functional configuration of the image processing system 1010.

As illustrated in FIG. 13, the scanner 115 includes a scanning unit 11 and the information processing apparatus 300 includes a mask image generating unit 12 and a show-through removing unit 13.

With the above functional configuration, the image processing system 1010 performs a process as described below. At the scanner 115, the scanning unit 11 scans printed surfaces of a printed material P and obtains scanned images (density images Ga and gloss images Gb). Next, the scanner 115 transfers the scanned images via the data communication line N to the information processing apparatus 300. At the information processing apparatus 300, the mask image generating unit 12 generates mask images Gc for the respective printed surfaces based on the transferred gloss images Gb. Then, the show-through removing unit 13 performs mask processing on the density images Ga using the generated mask images Gc to generate show-through-removed images Gd for the respective printed surfaces.

With the above described functional configuration, the image processing system 1010 provides the image processing functions of the first embodiment. More specifically, processing units of the scanner 115 and the information processing apparatus 300 of the image processing system 1010 execute software programs to implement the functional units described above and thereby provide the image processing functions of the first embodiment.

In the image processing system 1010, multiple scanners 115 may be connected to one information processing apparatus 300 to concurrently perform processes of removing show-through information for multiple printed materials P. This configuration makes it possible to accurately and efficiently remove show-through information from a large number of printed materials P.

In the functional configuration of FIG. 13, the scanner 115 includes the scanning unit 11 and the information processing apparatus 300 includes the mask image generating unit 12 and the show-through removing unit 13. However, any other appropriate configuration may be employed. For example, the scanner 115 may include the scanning unit 11 and the mask image generating unit 12, and the information processing apparatus 300 may include the show-through removing unit 13. In this case, the scanner 115 transfers the density images Ga and the mask images Gc for the respective printed surfaces to the information processing apparatus 300.

<<Second Embodiment>>

Figure 14A:
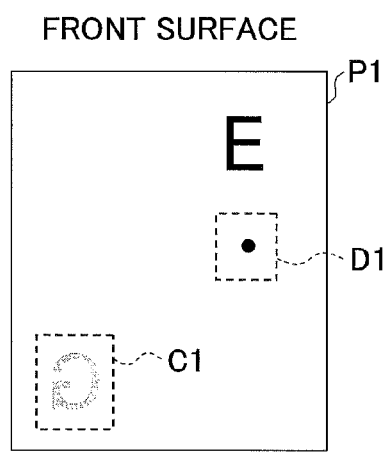
FIGS. 14A and 14B are drawings illustrating front and back surfaces of an exemplary double-sided printed material.
Figure 14B:
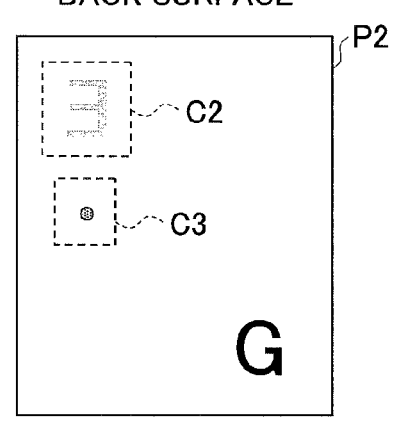

As illustrated in FIGS. 14A and 14B, information that is not included in print data, i.e., a smear, may be inadvertently formed on a printed surface of a printed material. Such a smear is caused by, for example, a smeared component (e.g., a photoconductor or a transfer belt) of a printing unit or a smeared conveying unit (e.g., a paper conveying belt).

FIGS. 14A and 14B are drawings illustrating front and back surfaces of an exemplary double-sided printed material. FIG. 14A illustrates a front surface P1, and FIG. 14B illustrates a back surface P2. As illustrated in FIG. 14A, unnecessary information (or a smear) that is not included in print data is printed on the front surface P1 (reference number D1). As illustrated in FIG. 14B, the unnecessary information on the front surface P1 is transmitted to the back surface P2 (reference number C3). Such a smear reduces the print quality and therefore it is necessary to determine the cause of the smear at an early stage and remove the cause (e.g., by cleaning a printing unit). This is particularly important for commercial printing.

A second embodiment makes it possible to remove show-through information as well as to identify a smear (or unnecessary information not included in print data) on a printed surface.

In the second embodiment, descriptions overlapping those in the first embodiment are omitted, and the same reference numbers as those used in the first embodiment are assigned to the corresponding components.

<Image Processing Functions>

Figure 15:
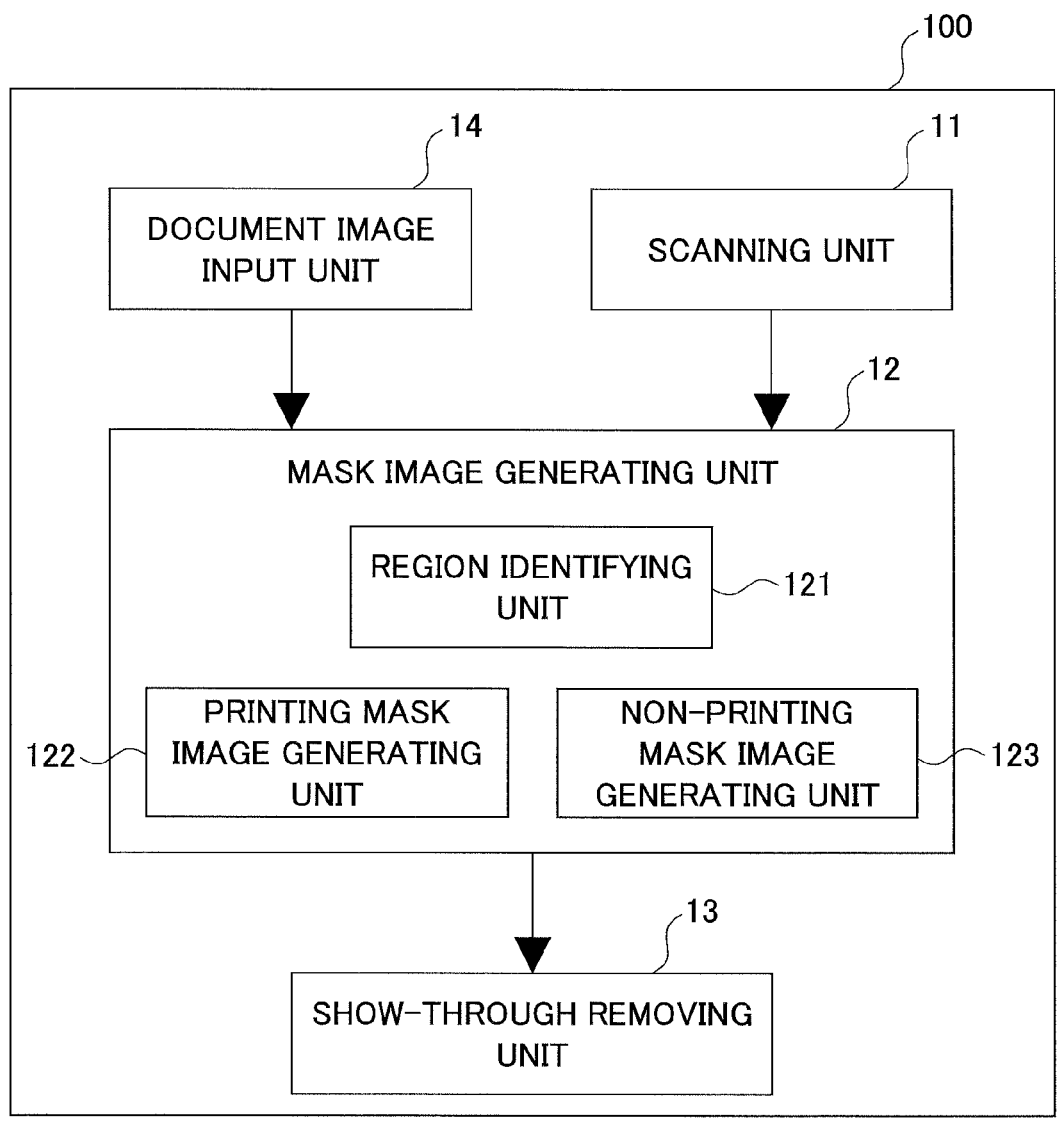
FIG. 15 is a block diagram illustrating an exemplary functional configuration of an image processing apparatus according to a second embodiment.

FIG. 15 is a block diagram illustrating an exemplary functional configuration of the image processing apparatus 100 according to the second embodiment.

In FIG. 15, a document image input unit 14 is provided in addition to the functional units illustrated in FIG. 4.

The document image input unit 14 is a functional unit that receives original data of a printed material P. Here, "original data" indicates image data obtained, for example, by ripping print data of the printed surfaces of the printed material P. In the descriptions below, the original data are called document images. The document image input unit 14 receives document images corresponding to the front surface P1 and the back surface P2 (i.e., two document images).

The mask image generating unit 12 of the second embodiment includes a region identifying unit 121, a printing mask image generating unit 122, and a non-printing mask image generating unit 123.

The region identifying unit 121 is a functional unit that identifies printing information regions and non-printing information regions in printed areas on the printed surfaces of the printed material P. The printing information regions are regions where information included in print data is printed, and the non-printing information regions are regions where information not included in the print data is printed. In other words, the region identifying unit 121 identifies non-printing information regions in printed areas.

The region identifying unit 121 compares pixels (or groups of pixels) of the gloss images Gb1 and Gb2 obtained by the scanning unit 11 with pixels (or groups of pixels) of the corresponding document images received by the document image input unit 14, and identifies printing information regions and non-printing information regions based on the comparison results.

More specifically, if a pixel (or group of pixels) of the gloss image Gb and the corresponding pixel (or group of pixels) of the corresponding document image (i.e., two pixels or two groups of pixels at the corresponding positions) both have pixel values, the region identifying unit 121 identifies the pixel (or group of pixels) of the gloss image Gb as a printing information region. Meanwhile, if a pixel (or group of pixels) of the gloss image Gb has a pixel value but the corresponding pixel (or group of pixels) of the corresponding document image does not have a pixel value, the region identifying unit 121 identifies the pixel (or group of pixels) of the gloss image Gb as a non-printing information region.

Based on the identification results of the region identifying unit 121, the mask image generating unit 12 generates a printing mask image representing the printing information regions and a non-printing mask image representing the non-printing information regions for each of the printed surfaces.

The printing mask image generating unit 122 is a functional unit that generates a printing mask image. The non-printing mask image generating unit 123 is a functional unit that generates a non-printing mask image.

The printing mask image generating unit 122 determines printing information regions in the printed areas of the gloss image Gb based on the identification results of the region identifying unit 121 and generates a printing mask image. For example, the printing mask image generating unit 122 sets pixel values of the determined printing information regions at "1" and sets other pixel values at "0" to generate a printing mask image. The printing mask image is used in mask processing to remove non-printing information regions and extract printing information regions.

Meanwhile, the non-printing mask image generating unit 123 determines non-printing information regions in the printed areas of the gloss image Gb based on the identification results of the region identifying unit 121 and generates a non-printing mask image. For example, the non-printing mask image generating unit 123 sets pixel values of the determined non-printing information regions at "1" and sets other pixel values at "0" to generate a non-printing mask image. The non-printing mask image is used in mask processing to remove printing information regions and extract non-printing information regions.

When both of the front surface P1 and the back surface P2 of the printed material P are scanned by the scanning unit 11, the mask image generating unit 12 generates a printing mask image and/or a non-printing mask image for each of the front surface P1 and the back surface P2 based on the corresponding gloss image Gb1 or Gb2. The non-printing mask image is generated when at least one non-printing information region is identified by the region identifying unit 121. Therefore, if no non-printing information region is identified, the mask image generating unit 12 may generate only printing mask images. Accordingly, the maximum number of mask images Gc generated for one printed material P is four.

The show-through removing unit 13 performs mask processing on the density images Ga1 and Ga2 using the mask images Gc. In the second embodiment, the show-through removing unit 13 generates, for each printed surface, a printing information region image by extracting printing information regions using the printing mask image, and also generates, for each printed surface, a non-printing information region image by extracting non-printing information regions using the non-printing mask image. In other words, the show-through removing unit 13 performs a show-through information removal process for each scanned image using the printing mask image, and extracts non-printing information regions in each scanned image using the non-printing mask image.

As described above, in the image processing apparatus 100 of the second embodiment, image processing functions are implemented through collaboration among functional units. Similarly to the first embodiment, the functional units of the second embodiment are implemented by executing software programs installed in the image processing apparatus 100. For example, the software programs are loaded by a processing unit (e.g., the CPU 111) from storage units (e.g., the HDD and/or the ROM) into a memory (e.g., the RAM) and are executed to implement the functional units of the image processing apparatus 100.

An exemplary process performed by the functional units of the image processing apparatus 100 of the second embodiment (collaboration among the functional units) is described below with reference to FIGS. 17A through 19B.

<Process of Removing Show-Through Information>

Figure 16:
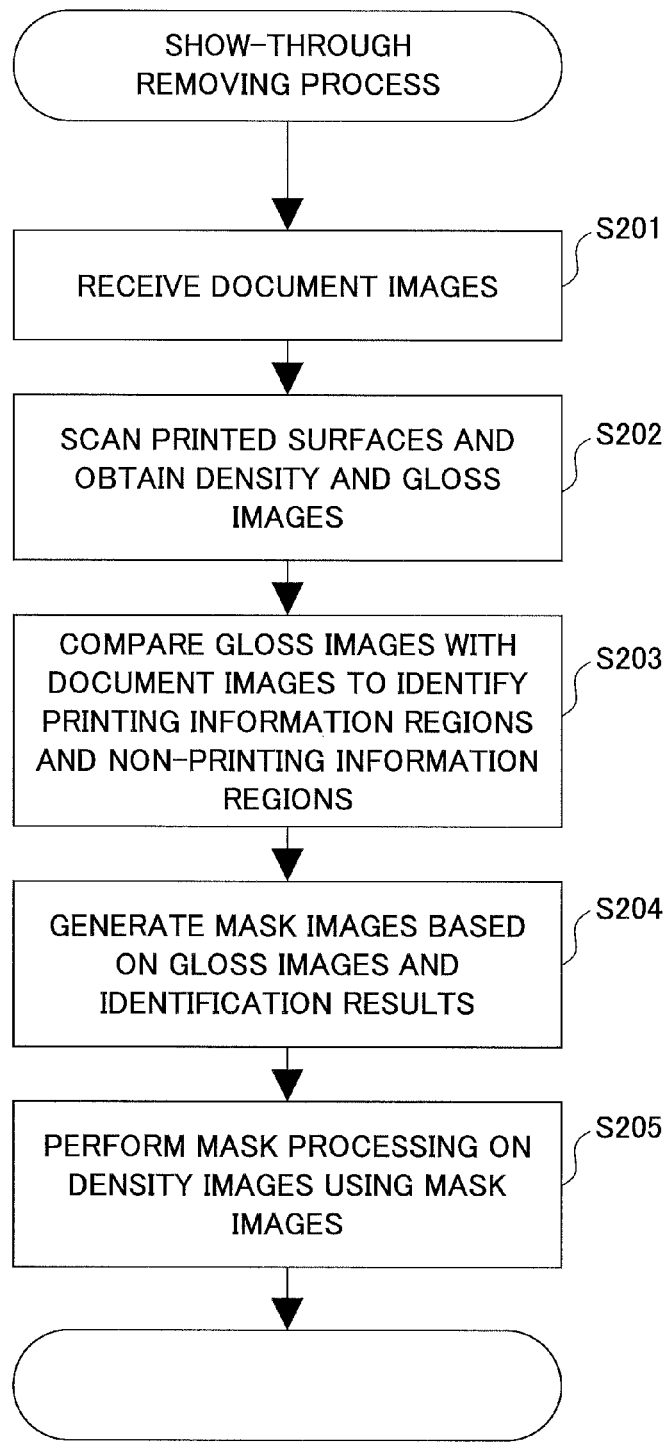
FIG. 16 is a flowchart illustrating an exemplary process of removing show-through information according to the second embodiment.

FIG. 16 is a flowchart illustrating an exemplary process of removing show-through information (show-through removing process) according to the second embodiment.

As illustrated in FIG. 16, the document image input unit 14 of the image processing apparatus 100 receives document images of printed surfaces of a printed material P (step S201).

Next, the scanning unit 11 scans printed surfaces (the front surface P1 and the back surface P2) of the printed material P, and obtains a density image and a gloss image for each of the printed surfaces (step S201).

Figure 17A:
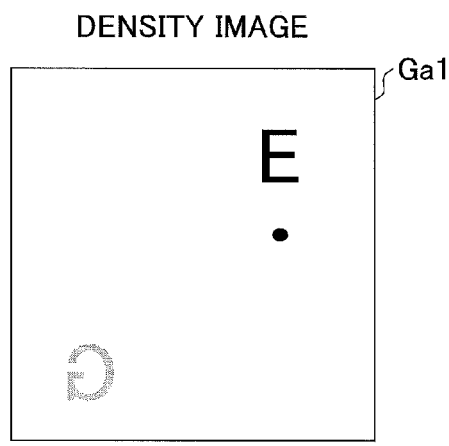
FIGS. 17A and 17B are drawings illustrating exemplary density images obtained by scanning front and back surfaces of a printed material.
Figure 17B:
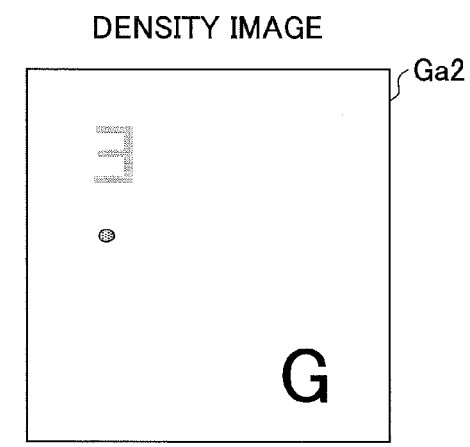

FIGS. 17A and 17B are drawings illustrating exemplary density images obtained by scanning the front and back surfaces P1 and P2 of the printed material P.

FIG. 17A illustrates a density image Ga1 obtained by scanning the front surface P1, and FIG. 17B illustrates a density image Ga2 obtained by scanning the back surface P2. In this exemplary process, the scanning unit 11 obtains the density images Ga1 and Ga2 for the respective printed surfaces. The density image Ga1 includes information that is not included in print data, and the density image Ga2 includes show-through information due to the characteristics of diffuse reflection light.

Figure 18A:
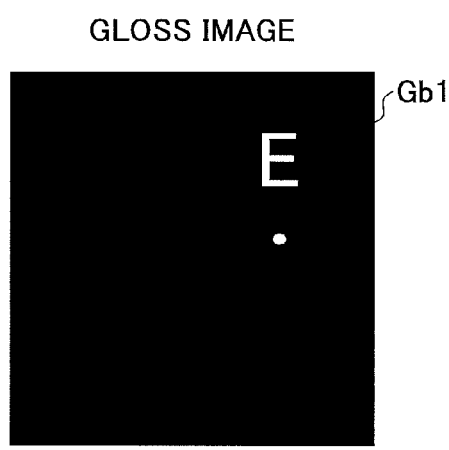
FIGS. 18A and 18B are drawings illustrating exemplary gloss images obtained by scanning front and back surfaces of a printed material.
Figure 18B:

FIGS. 18A and 18B are drawings illustrating exemplary gloss images obtained by scanning the front and back surfaces P1 and P2 of the printed material P.

FIG. 18A illustrates a gloss image Gb1 obtained by scanning the front surface P1, and FIG. 18B illustrates a gloss image Gb2 obtained by scanning the back surface P2. In this exemplary process, the scanning unit 11 obtains the gloss images Gb1 and Gb2 for the respective printed surfaces. The gloss image Gb1 includes information that is not included in the print data, and the gloss image Gb2 does not include show-through information due to the characteristics of specular reflection light.

Referring back to FIG. 16, the region identifying unit 121 of the mask image generating unit 12 identifies printing information regions and non-printing information regions in the printed areas on the printed surfaces of the printed material P based on the gloss images Gb1 and Gb2 and the document images (step S203). In this step, the region identifying unit 121 compares pixels (or groups of pixels) of the gloss images Gb1 and Gb2 with pixels (or groups of pixels) of the corresponding document images, and identifies printing information regions and non-printing information regions based on the comparison results.

Next, the printing mask image generating unit 122 and/or the non-printing mask image generating unit 123 of the mask image generating unit 12 generates printing mask images and/or non-printing mask images based on the gloss images Gb1 and Gb2, the document images, and the identification results of the region identifying unit 121 (step S204). Steps S203 and S204 are described in more detail below.

Figure 19B:
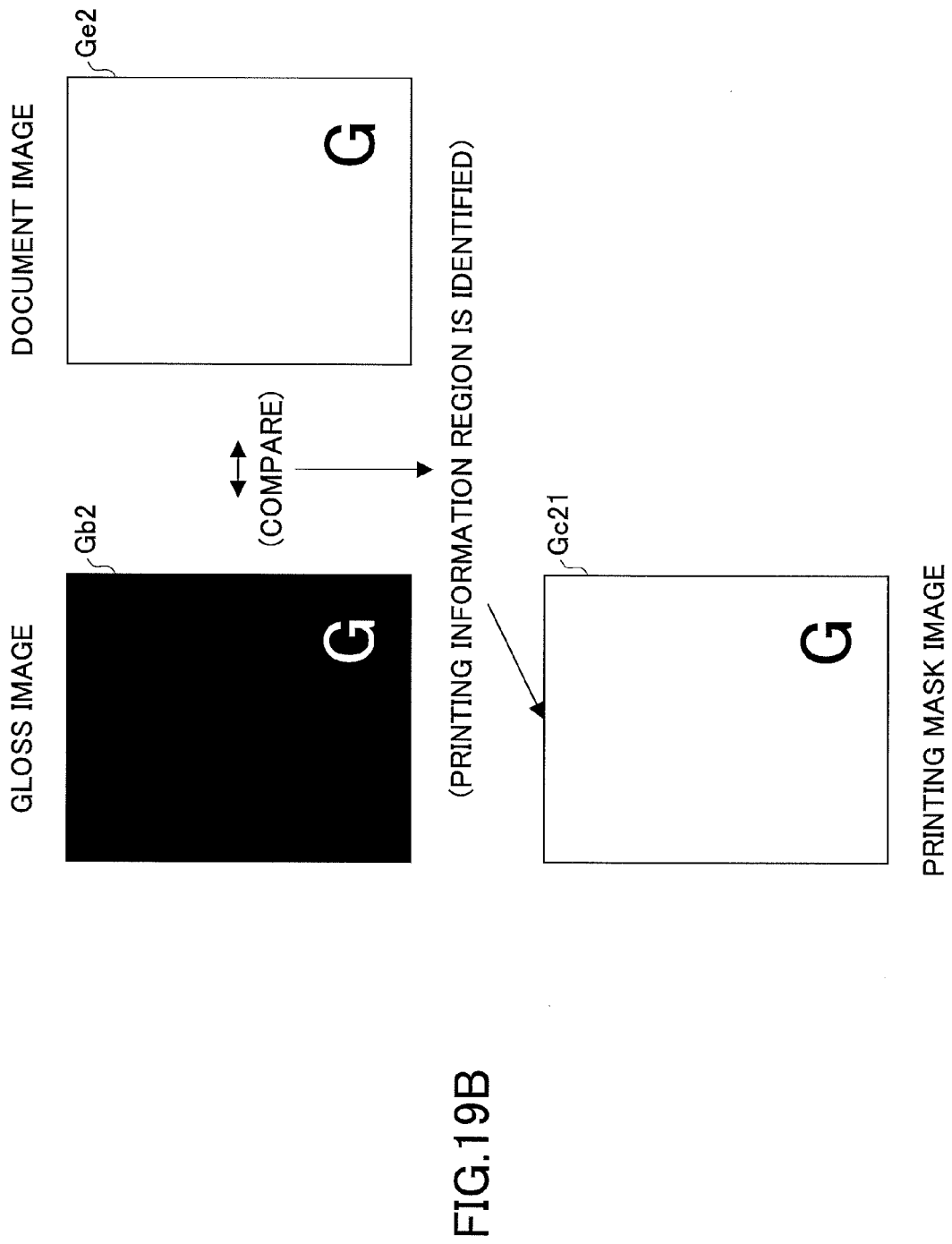

FIGS. 19A and 19B are drawings used to describe an exemplary process of generating mask images from the gloss images Gb1 and Gb2.

FIG. 19A illustrates a printing mask image Gc11 and a non-printing mask image Gc12 generated from the gloss image Gb1 and a document image Ge1 corresponding to the front surface P1. FIG. 19B illustrates a printing mask image Gc21 generated from the gloss image Gb2 and a document image Ge2 corresponding to the back surface P2.

In FIG. 19A, the region identifying unit 121 compares pixels (or groups of pixels) of the gloss image Gb1 and the document image Ge1 corresponding to the front surface P1, and identifies printing information regions and non-printing information regions in the printed areas on the front surface P1 based on the comparison results. In this case, both the printing mask image generating unit 122 and the non-printing image generating unit 123 of the mask image generating unit 12 perform processing. The printing mask image generating unit 122 determines printing information regions in the printed areas of the gloss image Gb1 based on the identification results, and generates the printing mask image Gc11 by setting pixel values of the determined printing information regions at "1" and setting other pixel values at "0". Meanwhile, the non-printing mask image generating unit 123 determines non-printing information regions in the printed areas of the gloss image Gb1 based on the identification results, and generates the non-printing mask image Gc12 by setting pixel values of the determined non-printing information regions at "1" and setting other pixel values at "0".

In FIG. 19B, the region identifying unit 121 compares pixels (or groups of pixels) of the gloss image Gb2 and the document image Ge2 corresponding to the back surface P2, and identifies only printing information regions in the printed areas on the back surface P2 based on the comparison results. In this case, only the printing mask image generating unit 122 of the mask image generating unit 12 performs processing. The printing mask generating unit 122 determines printing information regions in the printed areas of the gloss image Gb2 based on the identification results, and generates the printing mask image Gc21 by setting pixel values of the determined printing information regions at "1" and setting other pixel values at "0". Through the above process, the mask image generating unit 12 generates the mask images Gc11, Gc12, and Gc21 for the respective printed surfaces.

Referring back to FIG. 16, the show-through removing unit 13 performs mask processing (logical AND operations between pixels or groups of pixels) on the density images Ga1 and Ga2 using the corresponding mask images Gc11, Gc12, and Gc21 (step S205). As a result, a show-through-removed image Gd (printing information region image) and/or a non-printing information region image is generated for each of the printed surfaces. Step S205 is described in more detail below.

In the above process, the printing mask image Gc11 and the non-printing mask image Gc12 are generated for the front surface P1. The show-through removing unit performs mask processing on the density image Ga1 using the printing mask image Gc11 and thereby generates the show-through-removed image Gd1 for the front surface P1. The show-through removing unit 13 also performs mask processing on the density image Ga1 using the non-printing mask image Gc12 and thereby generates the non-printing information region image for the front surface P1.

Meanwhile, the printing mask image Gc21 is generated for the back surface P2 in the above process. The show-through removing unit 13 performs mask processing on the density image Ga2 using the printing mask image Gc21 and thereby generates the show-through-removed image Gd2 for the back surface P2.

Thus, the image processing apparatus 100 of the second embodiment removes show-through information from scanned images and identifies unnecessary information not included in print data from the scanned images.

The region identification step (S203), the mask image generation step (S204), and the mask processing step (S205) for plural printed surfaces may be performed in parallel. Also, the mask image generation step (S204) and the mask processing step (S205) for plural identified regions may be performed in parallel to increase the speed of image processing.

<Summary>

As described above, in the image processing apparatus 100 of the second embodiment, the scanning unit optically scans printed surfaces (the front surface and the back surface) of the double-sided printed material P, and obtains the density images Ga representing the intensity distribution of diffuse reflection light and the gloss images Gb representing the intensity distribution of specular reflection light for the respective printed surfaces. The document image input unit 14 receives the document images Ge (image data obtained by ripping print data) that are the original data of the printed material P.

Next, the mask image generating unit 12 compares the gloss images Gb with the corresponding document images Ge, and identifies printing information regions (where information in print data is printed) and non-printing information regions (where information not included in the print data is printed) in printed areas on the printed surfaces based on the comparison results. Next, the mask image generating unit 12 generates the mask images Gc (printing mask images for printing information regions and/or non-printing mask images for non-printing information regions) for the respective printed surfaces based on the gloss images Gb and the identified regions.

Then, the show-through removing unit 13 performs mask processing (logical AND operation) on the density images Ga using the generated mask images Gc to generate show-through-removed images Gd (printing information region images) and/or non-printing information region images for the respective printed surfaces.

Thus, the image processing apparatus 100 of the second embodiment can remove show-through information and can also identify a smear (or unnecessary information not included in print data) on a printed surface.

Identifying such a smear makes it possible to quickly respond to print problems (e.g., analyzing causes and cleaning smeared components).

The second embodiment may also be applied to the image forming apparatus 200 and the image processing system 1010 described above.

Third Embodiment

In commercial printing, strict quality control is performed. For example, printed materials are strictly inspected to determine whether they are correctly printed as intended (at high quality). In such an inspection process, operators or workers visually inspect the printed materials. However, in commercial printing where a large number of pages are printed, manual inspection is inefficient and may result in inconsistent inspection results.

A third embodiment makes it possible to automatically inspect printed materials based on the results of processes of removing show-through information and identifying non-printing information regions (or smears).

In the third embodiment, descriptions overlapping those in the first and second embodiments are omitted, and the same reference numbers as those used in the first and second embodiments are assigned to the corresponding components.

<Inspection Function

Figure 20:
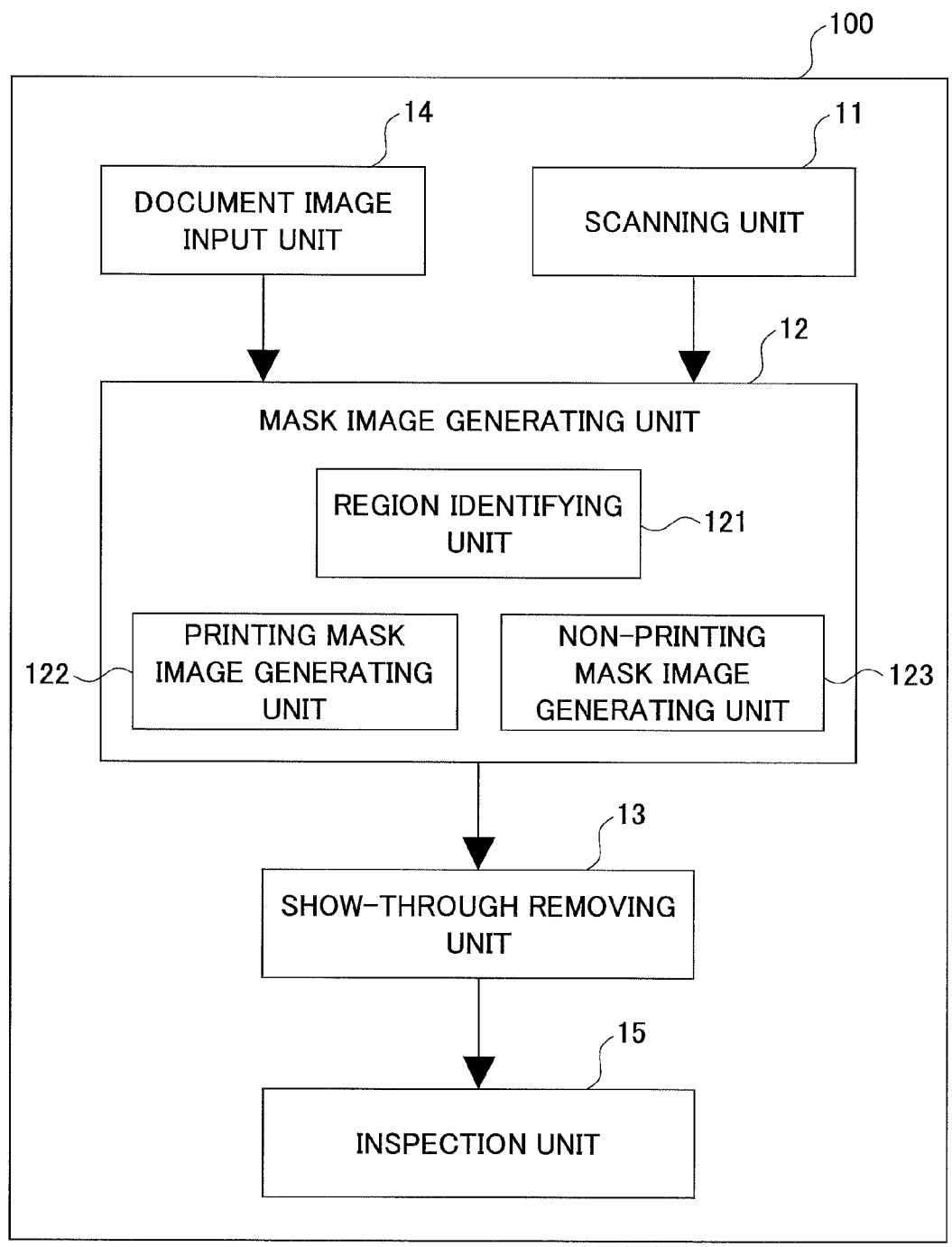
FIG. 20 is a block diagram illustrating an exemplary functional configuration of an image processing apparatus according to a third embodiment.

FIG. 20 is a block diagram illustrating an exemplary functional configuration of the image processing apparatus 100 according to the third embodiment.

In FIG. 15, an inspection unit 15 is provided in addition to the functional units illustrated in FIG. 15.

The inspection unit performs quality inspection on the printed material P based on the show-through-removed images Gd (printing information region images) and the non-printing information region images.

The inspection unit 15 inspects the printing information regions in the printed areas on the printed surfaces of the printed material P. The inspection unit compares image features of the show-through-removed images Gd1 and Gd2 (printing information region images) with image features of the document images Ge1 and Ge2, and determines whether the differences in the image features are within predetermined quality criteria. For example, "image features" may indicate color and density, and the quality criteria for the printing information regions may be represented by ranges of differences in color and density between corresponding pixels (or groups of pixels). In this case, the inspection unit 15 determines that the quality criteria are satisfied if the differences in color and density (i.e., image features) are within the ranges, and determines that the quality criteria are not satisfied if the differences in color and density exceed the ranges.

When a non-printing information region image is generated by the show-through removing unit 13, the inspection unit 15 also inspects the non-printing information region image. Based on the non-printing information region image (obtained by extracting a non-printing information region(s)), the inspection unit 15 determines whether a smear on the printed surface is within tolerable limits defined by quality criteria. The quality criteria for the non-printing information region may be represented by upper limits (or thresholds) of the size of the non-printing information region and differences in color and density between pixels (or groups of pixels) of the non-printing information and adjacent pixels (or groups of pixels) adjacent to the non-printing information. In this case, the inspection unit 15 determines that the smear (or the non-printing information) is tolerable if the size of the non-printing information region and the differences in color and density are less than or equal to the thresholds, and determines that the smear is not tolerable if the size of the non-printing information region and the differences in color and density are greater than the thresholds.

The quality criteria are preferably determined taking into account the scanning conditions and scanning characteristics of the scanner 115.

As described above, the inspection function of the third embodiment is implemented through collaboration among the functional units of the image processing apparatus 100. The functional units are implemented by executing software programs installed in the image processing apparatus 100. For example, the software programs are loaded by a processing unit (e.g., the CPU 111) from storage units (e.g., the HDD and/or the ROM) into a memory (e.g., the RAM) and are executed to implement the functional units of the image processing apparatus 100.

An exemplary inspection process according to the third embodiment is described below with reference to a flowchart. In the exemplary process below, it is assumed that the image processing apparatus 100 includes a mechanism for sorting printed materials P scanned by the scanner 115 and placing them onto appropriate trays.

<Print Quality Inspection Process>

Figure 21:
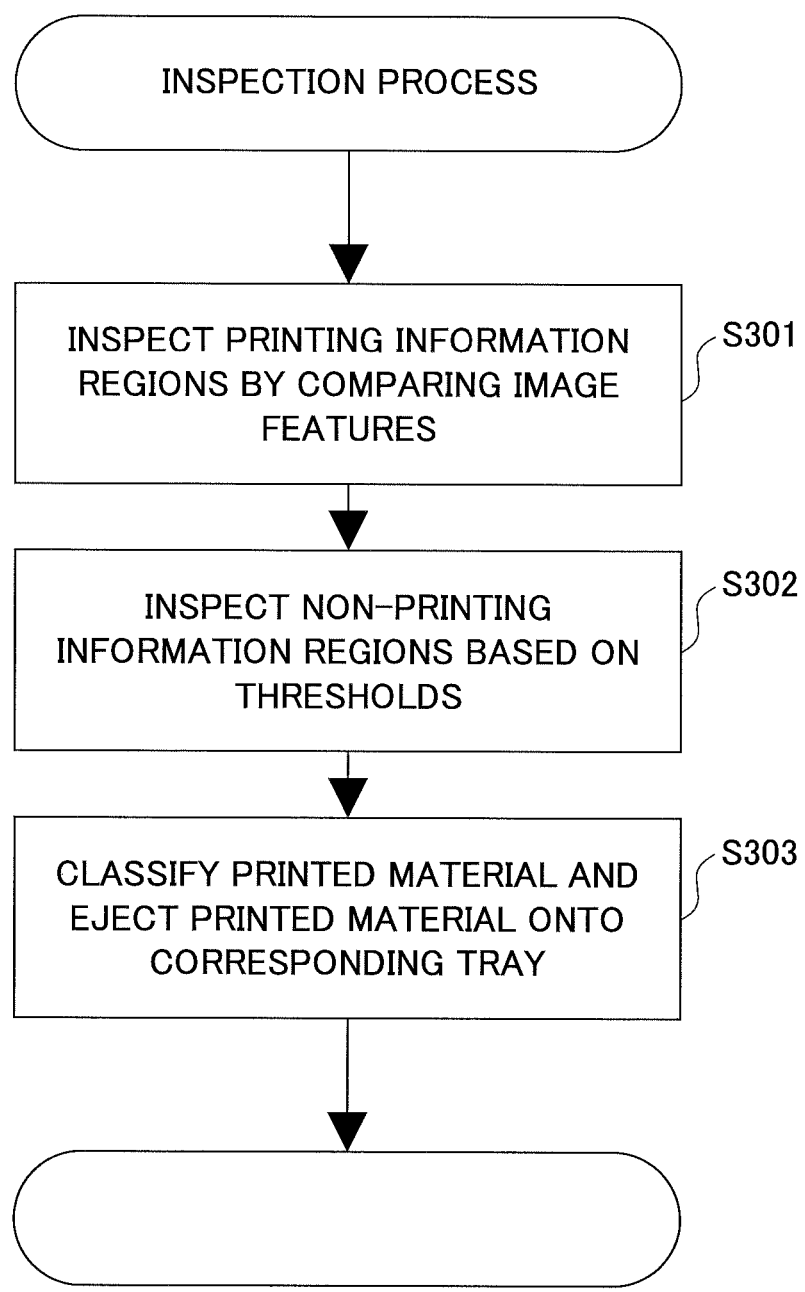
FIG. 21 is a flowchart illustrating an exemplary print quality inspection process according to the third embodiment.

FIG. 21 is a flowchart illustrating an exemplary print quality inspection process according to the third embodiment. In FIG. 21, it is assumed that a show-through removing process and a non-printing information region identification process have already been performed.

As illustrated in FIG. 21, the inspection unit of the image processing apparatus 100 inspects the printing information regions in the printed areas on the printed surfaces of the printed material P (step S301). In this step, the inspection unit 15 compares the image features of the show-through-removed images Gd1 and Gd2 and the image features of the document images Ge1 and Ge2, and determines whether the differences in the image features are within predetermined quality criteria. If the differences are within the quality criteria, the inspection unit 15 determines that the printed material P satisfies the quality criteria. Meanwhile, if the differences exceed the quality criteria, the inspection unit 15 determines that the printed material P does not satisfy the quality criteria.

When a non-printing information region image is generated by the show-through removing unit 13, the inspection unit 15 also inspects the non-printing information region image (step S302). In this step, the inspection unit 15 determines whether the non-printing information (or a smear) is within tolerable limits defined by quality criteria. The quality criteria for the non-printing information region may be represented by upper limits (or thresholds) of the size of the non-printing information region and differences in color and density between pixels (or groups of pixels) of the non-printing information and adjacent pixels (or groups of pixels) adjacent to the non-printing information. If the size of the non-printing information region and the differences in color and density are less than or equal to the thresholds, the inspection unit 15 determines that the non-printing information is tolerable. Meanwhile, if the size of the non-printing information region and the differences in color and density are greater than the thresholds, the inspection unit 15 determines that the non-printing information is not tolerable.

Based on the inspection results, the image processing apparatus 100 ejects the printed material P onto a corresponding tray (step S303). For example, based on the inspection results, the image processing apparatus 100 classifies the printed material P into one of the following four quality categories: a printed material whose printing information region satisfy quality criteria, a printed material whose printing information region do not satisfy quality criteria, a printed material whose non-printing information region is tolerable, and a printed material whose non-printing information region is not tolerable. Then, the image processing apparatus 100 ejects the printed material P onto a tray corresponding to the quality category of the printed material P. For this purpose, the image processing apparatus 100 may include a sorting unit that sorts the printed material P based on the inspection results and ejects the printed material P onto a corresponding tray.

<Summary>

As described above, in the image processing apparatus 100 of the third embodiment, the inspection unit 15 inspects printing information regions in the printed areas on the printed surfaces of the printed material P by comparing the show-through-removed images Gd (printing information region images) with the document images Ge. Also, the inspection unit 15 inspects a non-printing information region in the printed areas on the printed surfaces of the printed material P. Based on the inspection results, the image processing apparatus 100 classifies printed materials P into quality categories.

With the above configuration, the image processing apparatus 100 of the third embodiment makes it possible to efficiently inspect printed materials P according to predetermined criteria.

<Variation>

A variation of the third embodiment is described below.

The third embodiment may also be applied to an image processing system as described below.

Figure 22:
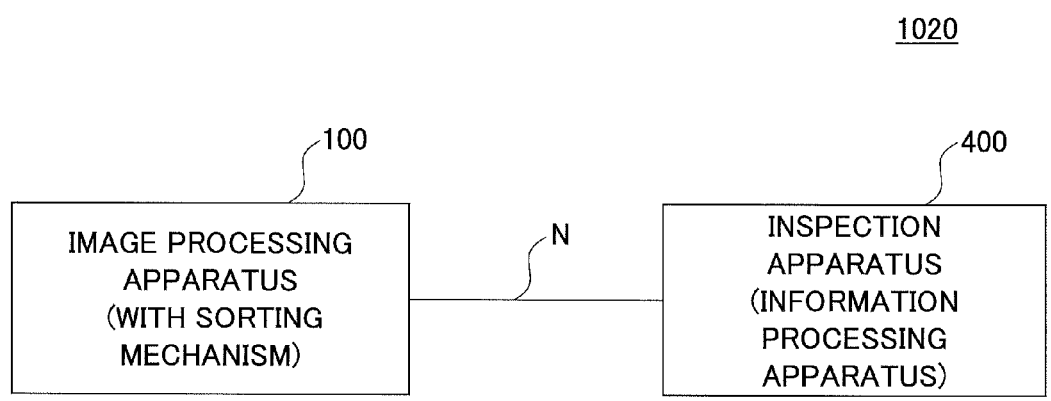
FIG. 22 is a drawing illustrating an exemplary configuration of an inspection system.

FIG. 22 is a drawing illustrating an exemplary configuration of an inspection system 1020.

As illustrated in FIG. 22, the inspection system 1020 includes an image processing apparatus 100 including a mechanism for sorting printed materials P and an inspection apparatus 400 that are connected to each other via a data communication channel N (e.g., a network cable or a serial/parallel cable).

The inspection apparatus 400 may be implemented by, for example, an information processing apparatus such as a personal computer (PC) that includes a computing function and an input/output function.

An exemplary functional configuration of the inspection system 1020 is described below.

Figure 23:
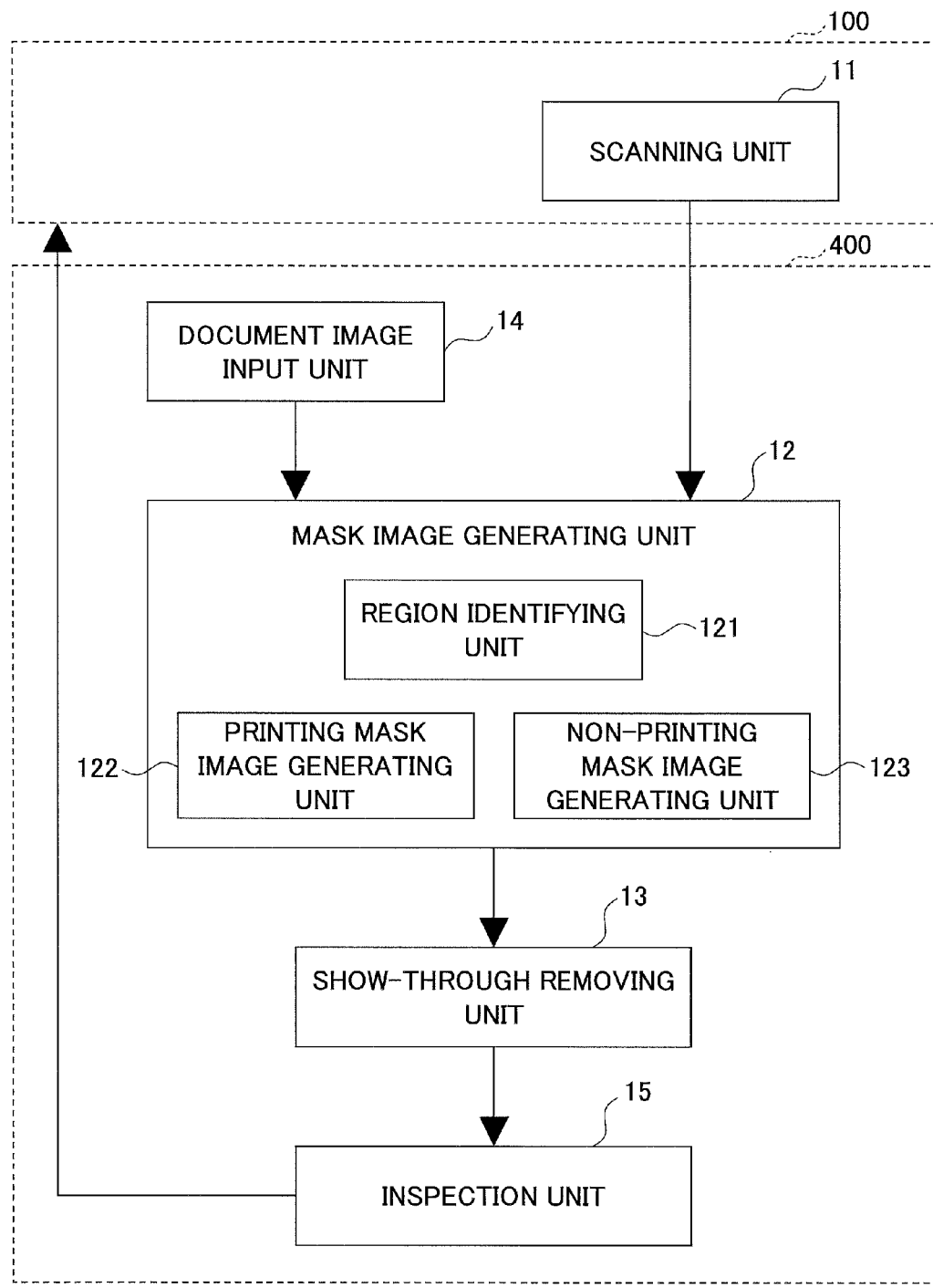
FIG. 23 is a block diagram illustrating an exemplary functional configuration of an inspection system.

FIG. 23 is a drawing illustrating an exemplary functional configuration of the inspection system 1020.

As illustrated in FIG. 23, the image processing apparatus 100 includes a scanning unit 11 and the inspection apparatus 400 includes a mask image generating unit 12, a show-through removing unit 13, a document image input unit 14, and an inspection unit 15.

With the above functional configuration, the inspection system 1020 performs a process as described below. At the image processing apparatus 100, the scanning unit 11 scans printed surfaces of a printed material P and obtains scanned images (density images Ga and gloss images Gb). Next, the image processing apparatus 100 transfers the scanned images via the data communication line N to the inspection apparatus 400.

At the inspection apparatus 400, the mask image generating unit 12 identifies printing information regions and non-printing information regions in printed areas on the printed surfaces of the printed material P based on the transferred gloss images Gb and the document images Ge received by the document image input unit 14, and generates mask images Gc (printing mask images and/or non-printing mask images) for the respective printed surfaces based on the identification results. Next, the show-through removing unit 13 performs mask processing on the density images Ga using the generated mask images Gc to generate show-through-removed images Gd and/or non-printing information region images (obtained by extracting non-printing information regions). The inspection unit 15 inspects the printing information regions and/or the non-printing information regions in the printed areas on the printed surfaces based on the generated show-through-removed images Gd and/or non-printing information region images. Next, the inspection apparatus 400 transfers the inspection results via the data communication line N to the image processing apparatus 100.

Then, based on the transferred inspection results, the image processing apparatus 100 classifies the printed material P into a quality category.

With the above described functional configuration, the inspection system 1020 provides the image processing functions and the inspection function of the third embodiment.

More specifically, processing units of the image processing apparatus 100 and the inspection apparatus 400 of the inspection system 1020 execute software programs to implement the functional units described above and thereby provide the image processing functions and the inspection function of the third embodiment.

In the inspection system 1020, multiple image processing apparatuses 100 may be connected to one inspection apparatus 400 to concurrently perform quality inspection for multiple printed materials P. This configuration makes it possible to efficiently perform quality inspection for a large number of printed materials P based on predetermined criteria.

As another variation of the third embodiment, the image forming apparatus 200 may include the scanning unit 11, the mask image generating unit 12, the show-through removing unit 13, the document image input unit 14, and the inspection unit 15.

The image processing functions and the inspection function of the above embodiments may be implemented, for example, by executing programs, which are written in a programming language(s) supported by the operating environment(s) (platform(s)) of the image processing apparatus 100, the image forming apparatus 200, and the information processing apparatus 300, using the processing units of the respective apparatuses.

Taking the image processing apparatus 100 as an example, the programs may be stored in a non-transitory computer-readable storage medium (i.e., the storage medium 114a) and installed into the image processing apparatus 100 via the external storage I/F 114. Alternatively, the programs may be downloaded via a telecommunication line and the network I/F 113 and installed into the image processing apparatus 100.

The third embodiment may also be applied to the image forming apparatus 200 and the image processing system 1010 described above.

The present invention is not limited to the specifically disclosed embodiments, and variations and modifications may be made without departing from the scope of the present invention.

What is claimed is:

1. An image processing apparatus, comprising:
a scanning unit configured
to scan at least one of two surfaces of a printed material on both of which information is printed, and
to obtain a density image representing intensity distribution of diffuse reflection light from the scanned surface and a gloss image representing intensity distribution of specular reflection light from the scanned surface;
a mask image generating unit configured to generate a mask image for the scanned surface based on the obtained gloss image; and
a show-through removing unit configured to perform mask processing on the density image using the generated mask image to generate a show-through-removed image that does not include show-through information for the scanned surface.

2. The image processing apparatus as claimed in claim 1, further comprising:
a document image input unit configured to receive a document image obtained from print data of the scanned surface of the printed material,
wherein the mask image generating unit is configured
to identify a printing information region on the scanned surface where information included in the print data is printed and/or a non-printing information region on the scanned surface where information not included in the print data is printed based on the gloss image and the document image, and
to generate a printing mask image corresponding to the printing information region and/or a non-printing mask image corresponding to the non-printing information region.

3. The image processing apparatus as claimed in claim 2, wherein the mask image generating unit is configured to
compare pixels of the gloss image with corresponding pixels of the document image, and
identify the printing information region and/or the non-printing information region based on the comparison results.

4. The image processing apparatus as claimed in claim 2, wherein the show-through removing unit is configured to extract the printing information region by performing the mask processing on the density image using the printing mask image and thereby generate the show-through-removed image.

5. The image processing apparatus as claimed in claim 2, wherein the show-through removing unit is configured to extract the non-printing information region by performing the mask processing on the density image using the non-printing mask image and thereby generate a non-printing information region image.

6. The image processing apparatus as claimed in claim 2, further comprising:
an inspection unit configured to inspect the printed material,
wherein the inspection unit is configured to determine whether the printing information region satisfies a predetermined quality criterion based on the show-through-removed image and the document image.

7. The image processing apparatus as claimed in claim 6, wherein the inspection unit is configured
to compare an image feature of the show-through-removed image and the corresponding image feature of the document image, and
to determine that the printing information region satisfies the quality criterion if a difference in the image feature between the show-through-removed image and the document image is within the quality criterion.

8. The image processing apparatus as claimed in claim 6, wherein
the show-through removing unit is configured to extract the non-printing information region by performing the mask processing on the density image using the non-printing mask image and thereby generate a non-printing information region image; and
the inspection unit is further configured to determine whether the non-printing information region is within a tolerable limit based on the non-printing information region image.

9. The image processing apparatus as claimed in claim 1, wherein in the mask processing, the show-through removing unit performs logical AND operations between pixel values of the density image and the mask image.

10. The image processing apparatus as claimed in claim 6, further comprising:
a sorting unit configured to sort the printed material based on a determination result of the inspection unit.

11. An image processing method performed by an image processing apparatus, the method comprising:
scanning at least one of two surfaces of a printed material on both of which information is printed;
obtaining a density image representing intensity distribution of diffuse reflection light from the scanned surface and a gloss image representing intensity distribution of specular reflection light from the scanned surface;

generating a mask image for the scanned surface based on the obtained gloss image; and performing mask processing on the density image using the generated mask image to generate a show-through-removed image that does not include show-through information for the scanned surface.

12. A non-transitory computer-readable storage medium storing program code for causing an image processing apparatus to perform a method comprising:

scanning at least one of two surfaces of a printed material on both of which information is printed;

obtaining a density image representing intensity distribution of diffuse reflection light from the scanned surface and a gloss image representing intensity distribution of specular reflection light from the scanned surface;

generating a mask image for the scanned surface based on the obtained gloss image; and performing mask processing on the density image using the generated mask image to generate a show-through-removed image that does not include show-through information for the scanned surface.

\* \* \* \* \*